US 6,607,375 B1

(12) United States Patent
Takada et al.

(10) Patent No.: US 6,607,375 B1
(45) Date of Patent: Aug. 19, 2003

(54) SYSTEM OF INJECTION BLOW MOLDING AND INJECTION MOLDING DEVICE

(75) Inventors: Minoru Takada, Ueda (JP); Koichi Sato, Ueda (JP); Atsushi Sakurai, Saku (JP); Yoichi Netsu, Saku (JP); Yoichi Tsuchiya, Karuizawa-machi (JP)

(73) Assignee: Nissei Asb Machine Co., Ltd., Nagano (JP)

( * ) Notice: Subject to any disclaimer, the term of this patent is extended or adjusted under 35 U.S.C. 154(b) by 0 days.

(21) Appl. No.: 09/653,222

(22) Filed: Aug. 31, 2000

Related U.S. Application Data

(63) Continuation of application No. 09/051,956, filed as application No. PCT/JP97/03064 on Sep. 2, 1997, now Pat. No. 6,156,258.

(30) Foreign Application Priority Data

| Sep. 2, 1996 | (JP) | 8-250906 |
| Mar. 26, 1997 | (JP) | 9-91451 |
| Apr. 18, 1997 | (JP) | 9-116299 |

(51) Int. Cl.⁷ .................... B29C 49/08; B29C 49/06; B29C 49/64
(52) U.S. Cl. ........................ 425/526; 425/529; 425/533; 425/534; 425/556
(58) Field of Search ................. 264/531, 535, 264/537; 425/526, 529, 533, 534, 556

(56) References Cited

U.S. PATENT DOCUMENTS

| 4,076,484 A | 2/1978 | Armour et al. ........... 425/533 |
| 4,261,949 A | 4/1981 | Spurr et al. .............. 264/535 |
| 4,729,732 A | 3/1988 | Schad et al. ............. 425/534 |
| 5,403,177 A | 4/1995 | Priest ..................... 425/529 |
| 5,468,443 A | 11/1995 | Takada et al. ........... 264/537 |
| 5,589,130 A | 12/1996 | Takada et al. ........... 264/537 |
| 5,653,934 A | 8/1997 | Brun, Jr. et al. ......... 425/534 |
| 5,975,880 A | 11/1999 | Takada et al. ........... 425/534 |

FOREIGN PATENT DOCUMENTS

| EP | 0534367 A1 | 3/1993 |
| EP | 667 224 A1 | 8/1995 |
| GB | 2093396 | 9/1982 |
| JP | 61-125833 A * | 6/1986 |
| JP | 3-45692 | 7/1991 |
| JP | 5-301275 | 11/1993 |
| JP | 6-134844 | 5/1994 |
| JP | 6-134845 | 5/1994 |
| JP | 7-32456 | 2/1995 |
| JP | 7-266412 | 10/1995 |
| JP | 7-276477 | 10/1995 |
| JP | 8-132517 | 8/1996 |
| WO | WO 96/08356 | 3/1996 |

* cited by examiner

*Primary Examiner*—Robert Davis
(74) *Attorney, Agent, or Firm*—Law Offices of David L. Hoffman

(57) ABSTRACT

An injection blow molding system includes an injection molding station (22), a first delivery section (24), a cooling station (26), a heating station (30), a second delivery section (32) and a plurality of blow molding stations (34). The station (22) simultaneously injection molds M rows of N preforms (36) arranged in a second direction (B) perpendicular to a first direction (A) in which the preforms (36) are carried. The first delivery section (24) removes the M rows of preforms (36) using a removing mechanism (102) in their upright state while decreasing the pitch in the rows. The preforms 36 are inverted with the column pitch changed by an inverting mechanism (104) before delivery to the cooling station in their inverted state. The cooling and heating stations (26), (30) cool and heat one row of N preforms (36) while parallel carrying them along a first carrying chain (200). The second delivery section (32) delivers the preforms (36) to two blow molding stations while in their inverted state. Each blow molding station (34) stretch blow molds the N/2 preforms into containers at the same time.

11 Claims, 21 Drawing Sheets

SYSTEM OF INJECTION BLOW MOLDING AND INJECTION MOLDING DEVICE

CROSS REFERENCE TO RELATED APPLICATIONS

This application is a continuing application of U.S. patent application Ser. No. 09/051,956 filed Sep. 4, 1998 and now U.S. Pat. No. 6,156,258, which is a 371 of PCT/JP97/03064 filed Sep. 2, 1997 from which priority is claimed.

BACKGROUND OF THE INVENTION

1. Field of the Invention

The present invention relates to a system and method of injection blow molding and injection molding device, and particularly to a system and method of injection blow molding in which preforms are injection molded before temperature regulating, and then blow molded into containers.

2. Description of the Prior Art

One of the injection blow molding systems for molding containers is described in Japanese Patent Publication No. 3-45692, for example.

The injection blow molding system described in this Japanese Patent Publication No. 3-45692 is shown in FIG. 15 of the accompany drawings and comprises an injection molding station 2, a first temperature regulating station 4, a second temperature regulating station 6, a blow molding station 8 and a removing station 10, all of which are arranged in a line.

The injection molding station 2 simultaneously injection molds two rows of four preforms 12 arranged in a direction perpendicular to a preform carrying direction shown by an arrow in this figure. The pitch P1 between two rows of the injection molded preforms 12 (which will be referred to "the injection molding pitch P1") is then changed to a larger pitch P2 for blow molding in the blow molding station 8 (which will be referred to "the blow molding pitch P2"). The preforms 12 are then carried through the first and second temperature regulating stations 4, 6, blow molding station 8 and removing station 10 while the blow molding pitch P2 is maintained.

In the injection molding station 2, the preforms 12 are injection molded and carried in their upright state.

Since the injection blow molding system of Japanese Patent Publication No. 3-45692 is designed to change the injection molding pitch P1 to the blow molding pitch P2 immediately after the preforms 12 have been injection molded, the preforms 12 will be carried with this larger pitch P2 from the injection molding station 2 through the first and second temperature regulating stations 4, 6 to the blow molding station 8. This causes a waste of space in the first and second temperature regulating stations 4, 6, resulting in increase of the entire system size and manufacturing cost.

When beverage containers or the like are to be molded by such a system, it is desired to maintain the molding room clean. When such a clean atmosphere is to be maintained in the larger area, the installation and maintenance costs will be increased. To avoid this, it is important to reduce the area of installation as small as possible.

Furthermore, such an injection blow molding system is designed to carry the upright preforms 12. When the preforms 12 are heated, the necks of the erected preforms 12 may be excessively heated to be undesirably deformed because the necks of the preforms 12 are topped and the heat moves upward. In this case, further, carrying members used to carry the preforms may also be adversely affected by the heat.

Since the preforms 12 are blow molded by the blow molding station 8 in their upright state, the necessary parts for blow molding the preforms 12 such as stretching rods and others must be placed above the preforms 12. This will increase the entire height of the system and raise a problem in the installation space and maintenance.

SUMMARY OF THE INVENTION

An object of the present invention is to prevent any wasteful use of space when carrying the preforms and to improve the efficiency on molding.

Another object of the present invention is to reduce the installation area of the system to as small as possible.

Still another object of the present invention is to prevent the necks of the preforms from being excessively heated and also to avoid the preform carrying members from being adversely affected by the heat.

A further object of the present invention is to reduce the entire height of the system and also the installation space and also to facilitate the maintenance.

According to one aspect of the present invention, an injection blow molding system comprises:
- an injection molding station for injection molding preforms;
- a cooling station for cooling the preforms while carrying the preforms in a first direction;
- a first delivering section for receiving the preforms from the injection molding station and delivering the preforms to the cooling station;
- a heating station for heating the preforms cooled by the cooling station while carrying the preforms in the first direction;
- a plurality of blow molding stations for stretch blow molding the preforms into containers; and
- a second delivering section for receiving the preforms from the heating station and delivering the preforms to the blow molding stations;

wherein:
- the injection molding station has an injection mold for simultaneously injection molding the preforms in an upright state, when the preforms are arranged in an M×N (M≧2, N≧2) matrix having M rows extending parallel to a second direction which is perpendicular to the first direction and N columns in each row;
- the first delivering section has a removing mechanism for removing the M×N matrix of the preforms in an upright state out of the injection molding station, and an inverting mechanism for inverting the preforms to deliver to the cooling station;
- the cooling station and the heating station have a first carrying path in common for intermittently carrying one row of N preforms at a time in an inverted state;
- the second delivering section has a transfer mechanism for receiving the one row of N preforms heated by the heating station from the first carrying path to transfer to the blow molding stations in an inverted state; and
- each of the blow molding stations includes:
  - a second carrying path having a substantially rectangular shape with two shorter sides and two longer sides;
  - a receiving section located on one of the shorter sides in the second carrying path for receiving the preforms from the second delivering section in a state of inversion;

a blow molding section located on one of the longer sides in the second carrying path for simultaneously stretch blow molding the preforms received by the receiving section into containers; and a removing section located on the other shorter side opposite to the receiving section for removing the containers molded by the blow molding section.

According to the present invention, the system will not be spread in a direction perpendicular to the first direction because the injection molding station, first delivering section, cooling station, heating station, second delivering section and blow molding station are arranged linearly in the first direction. This can minimize the installation area and save the space. Particularly, the area of the clean room in which the beverage containers are molded can be more effectively used.

Since the injection molding station simultaneously injection molds M×N preforms, the number of preforms for blow molding time can be secured to improve the efficiency in the molding cycle.

At the first delivering section, M rows of preforms are preferably delivered to the cooling station after the row pitch between M rows has been changed. By additionally cooling the preforms at the cooling station, the temperature in the injection molded preforms can be uniformly lowered so that the influence of the temperature control at the re-heating step will be increased to improve the stability on molding.

By heating the preforms cooled by the cooling station at the heating station in their inverted state, the necks of the preforms as well as the carrying members supporting the preforms in their inverted state will not be excessively heated. This can reliably prevent any deformation of the preform necks and the adverse effects of heat to the carrying members. In the cooling and heating stations, it is preferred that the preforms are rotated about their longitudinal axes by a rotation mechanism to cool and heat the preforms uniformly around their circumferences.

The inverted preforms are delivered from the second receiving section to the blow molding stations arranged parallel to one another. In each of the blow molding stations, the preforms are received by the receiving section located on the one shorter side of the second carrying path. The received preforms are simultaneously stretch blow molded by the blow molding section located on the longer side of the second carrying path. The molded containers are then removed by the removing section located on the other shorter side of the second carrying path. By blow molding the preforms in their inverted state, any elevator devices such as stretching rods and others are not required above the preforms. This can reduce the entire height and space required by the system and facilitate the maintenance. Since the blow molding section are located on the one longer side of the second carrying path, a blow clamping mechanism may be placed within the space between the longer sides of the second carrying path. This means that such a space can be more effectively utilized.

According to another aspect of the present invention, an injection blow molding station comprises:

an injection molding station for injection molding preforms in an upright state;

a carrying path for carrying the preforms in a first direction;

a delivering section for receiving the preforms from the injection molding station and delivering the preforms to the carrying path;

a heating station located on the carrying path for heating the preforms while carrying them a temperature equal to or higher than a proper stretching temperature; and at least one blow molding station for stretch blow molding the preforms heated by the heating station into containers;

wherein:

the injection molding station includes:

an injection mold having upper and lower mold portions for simultaneously injection molding the preforms in an inverted state, when the preforms are arranged in an M×N matrix ($M \geq 2$, $N \geq 2$) having M rows extending parallel to a second direction which is perpendicular to the first direction and N columns in each row;

an upper mold clamping plate on which the upper mold portion is mounted;

a lower mold clamping plate on which the lower mold portion is mounted; and a clamping plate driving mechanism for moving the upper mold clamping plate in a vertical direction;

the carrying path includes carrying members arranged in parallel to carry one row of N preforms at a time; and the delivering section includes:

M rows of removing plates each of which moves between the upper and lower mold portions in the injection molding station to receive N preforms; and a removing mechanism which makes the M rows of removing plates advance toward and retreat from the injection molding station to remove the M×N preforms, and which has a pitch changing mechanism for increasing a row pitch in the M rows of removing plates when advancing and for decreasing the row pitch when retreating.

According to this aspect of the present invention, the first delivering section delivers a plurality of injection molded preform rows to the heating station while reducing the row pitch between the injection molded preform rows in the preform carrying direction. Thus, time required to deliver the preforms can be reduced. The space required to carry and heat the preforms in the heating station can be reduced. This means that more preforms can be carried and heated within the same space and that the efficiency on molding can be improved. Furthermore, the entire length of the heating station can be reduced to save the space more. In addition, each of the removing and inverting mechanisms may be of a separate structure that can be reduced in weight and improved in operational speed.

In the above arrangement, it is preferred that the inverting mechanism may change the column pitch in the preforms while being inverted.

Each of the M rows of removing plates may have N cylindrical receiving members, each of which receives N preforms at a time with the portion thereof to be held by the holding members being exposed. In such a case, four holding members must be provided at four different heights. If the heights of these four holding members are also changed during the inverting step, time required to change these heights may be included in the inverting time. This means that the molding cycle can be reduced.

According to a further aspect of the present invention, an injection blow molding system comprises:

an injection molding station for injection molding preforms in an upright state;

a first carrying path for carrying the preforms in a first direction;

a first delivering section which includes a removing mechanism for removing the preforms from the injection molding station and a delivering mechanism for delivering the removed preforms to the first carrying path;

a heating station located on the first carrying path for heating the preforms while carrying to a temperature equal to or higher than a proper stretching temperature; and at least one blow molding station for stretch blow molding the preforms heated by the heating station into containers;

wherein:

the injection molding station includes:

an injection mold having upper and lower mold portions for simultaneously injection molding the preforms in an upright state, when the preforms are arranged in a M×N matrix (M≧2, N≧2) having M rows extending parallel to a second direction which is perpendicular to the first direction and N columns in each row;

an upper mold clamping plate on which the upper mold portion is mounted;

a lower mold clamping plate on which the lower mold portion is mounted; and a clamping plate driving mechanism which has four tie-bars to move the upper mold clamping plate in a vertical direction;

the first carrying path includes carrying members arranged in parallel to carry the one row of N preforms at a time in an upright state; and the removing mechanism of the first delivering section includes:

at least one removing plate which advances toward and retreat from the injection molding station to receive the preforms; and a plurality of removing rails which conducts the at least one removing plate at its opposite ends into between the upper and lower mold clamping plates;

the removing rails are fixedly mounted between the lower mold portion and the four tie-bars, and extends from the injection molding station toward the first delivering section.

In the arrangement just mentioned above, the removing rails are fixedly mounted between the lower mold portion and the four tie-bars. Thus, the removing plates can be stably advanced or retreated by advancing/retreating members which can be reduced in weight. In addition, their associated components can be omitted.

It is further preferred that the first carrying path has separate rotation mechanisms for rotating the preforms about their longitudinal axes in the cooling and heating stations and that a non-rotation area is provided between the rotation mechanism wherein at least one row of preforms are stopped. Thus, the non-rotation area may include a gate cutting mechanism for cutting the gates of the preforms. Such a gate cutting mechanism can cut the gates of the cooled preforms before they are re-heated. This is because preforms can be more easily and reliably cut at their gates if they are not rotated and also heated.

The present invention further provides an injection blow molding method comprising:

an injection molding step for injection molding preforms in an upright state in an injection molding station;

a removing step for removing the preforms from the injection molding station in a first direction;

a first delivering step for inverting the removed preforms to deliver in an upright state;

a cooling step for cooling the delivered preforms while carrying in the first direction in an upright state;

a heating step for heating the cooled preforms while carrying in the first direction in an upright state;

a second delivering step for delivering the heated preforms in an upright state; and a blow molding step for stretch blow molding the delivered preforms into containers;

wherein:

in the injection molding step, the preforms are simultaneously injection-molded when the preforms are arranged in a M×N (M≧2, N≧2) matrix having M rows extending parallel to a second direction which is perpendicular to the first direction and N columns in each row;

in the removing step, a row pitch in the M rows is changed while the preforms are being removed;

in the first delivering step, a column pitch of the N columns is changed while the preforms are being inverted; and in the cooling and heating steps, the one row of N preforms are carried at a time in the first direction.

According to the method of the present invention, the carrying space can be reduced by delivering the preforms to the cooling step while decreasing the row pitch in the preforms injection molded at the injection molding step. Since the preforms are inverted while changing the column pitch in the delivering step and also M rows of preforms are simultaneously delivered to the cooling step, time required to deliver the preforms can be reduced to shorten the molding cycle.

The preforms may be grouped into N/2 which are heated by two heating stations. The N/2 preforms heated by the respective heating station may be blow molded by each of two blow molding stations. Thus, the preforms simultaneously heated by each of the heating stations can be simultaneously blow molded by the respective one of the blow molding stations. This can equalize the quality of product in the blow molding step. Even if the number of preforms in one row increases, this can be treated without increasing the blow molding station in size.

The present invention further provides an injection molding device comprising:

an injection mold which includes upper and lower mold portion for simultaneously injection molding M×N preforms (M≧2, N≧2) in an upright state;

an upper mold clamping plate for supporting the upper mold portion;

a lower mold clamping plate for supporting the lower mold portion;

a clamping plate driving mechanism which has four tie-bars to movie the upper mold clamping plate in a vertical direction; and a removing mechanism for removing the M×N preforms;

wherein:

the lower mold portion has an injection cavity mold;

the upper mold portion has an injection core mold and split neck cavity molds; and the removing mechanism includes:

at least one removing plate which moves between the upper and lower mold clamping plates when opening of the injection mold and holds and removes the injection-molded preforms; and a plurality of removing rails for conducting the at least one removing plate at its opposite ends.

In the injection molding device of the present invention, the clamping plate driving mechanism for only moving the upper mold portions can remove the M×N simultaneously injection molded preforms by horizontally moving the at least one removing plate.

The removing rails may be mounted on a removing rail supporting plate which is fixedly mounted on the lower mold clamping plate. Thus, the removing plate can be more stably moved.

The present invention further provides a mold device for injection molding cylindrical bottom-closed preforms each having a neck, comprising:

a stationary mold clamping plate;

a movable mold clamping plate;

an injection cavity mold mounted on the stationary mold clamping plate;

an injection core mold which is clamped with the injection cavity mold when the movable mold clamping plate is driven;

an injection core mold fixing plate mounted on the movable mold clamping plate for fixing the injection core mold;

an injection core mold holding plate mounted on the movable mold clamping plate between the injection core mold fixing plate and the lower mold clamping plate;

split neck cavity molds which are clamped with the injection core mold;

a neck mold fixing plate including the split plates each of which holds the respective one of the split neck cavity molds;

a stripper plate disposed between the neck mold fixing plate and the injection core mold fixing plate to move relative to the injection core mold fixing plate, and neck mold fixing plate guide rails for holding the neck mold fixing plate, the neck mold fixing plate being slidably movable relative to the stripper plate to guide the neck mold fixing plate in the direction in which the split neck cavity molds are opened;

wherein the stripper plate includes:

a connecting portion to a moving rod for moving the stripper plate; and an engaging portion being engaged with a release rod which moves the stripper plate downward to release the preforms from the injection core mold; and each of the injection core mold holding plate and injection core mold fixing plates has a bore through which the release rod extends.

In such a mold device, the preforms held by the injection core mold and split neck cavity molds can be released from the injection cavity mold by moving the movable mold clamping plate. Thereafter, the release rod is moved to move the stripper plate relative to the injection core mold fixing plate so that a gap will be created between the preforms and the injection core mold. At this time, the neck mold fixing plate guide rails may be slidably moved relative to the stripper plate to move the neck mold fixing plate. Thus, the split neck cavity molds are opened to release the preforms from the injection core mold and split neck cavity molds completely.

DESCRIPTION OF THE PREFERRED EMBODIMENT

Several preferred embodiments of the present invention will now be described in detail with respect to the drawings.

FIGS. 1 to 14 show one embodiment of an injection blow molding system constructed in accordance with the present invention.

Figure 1:
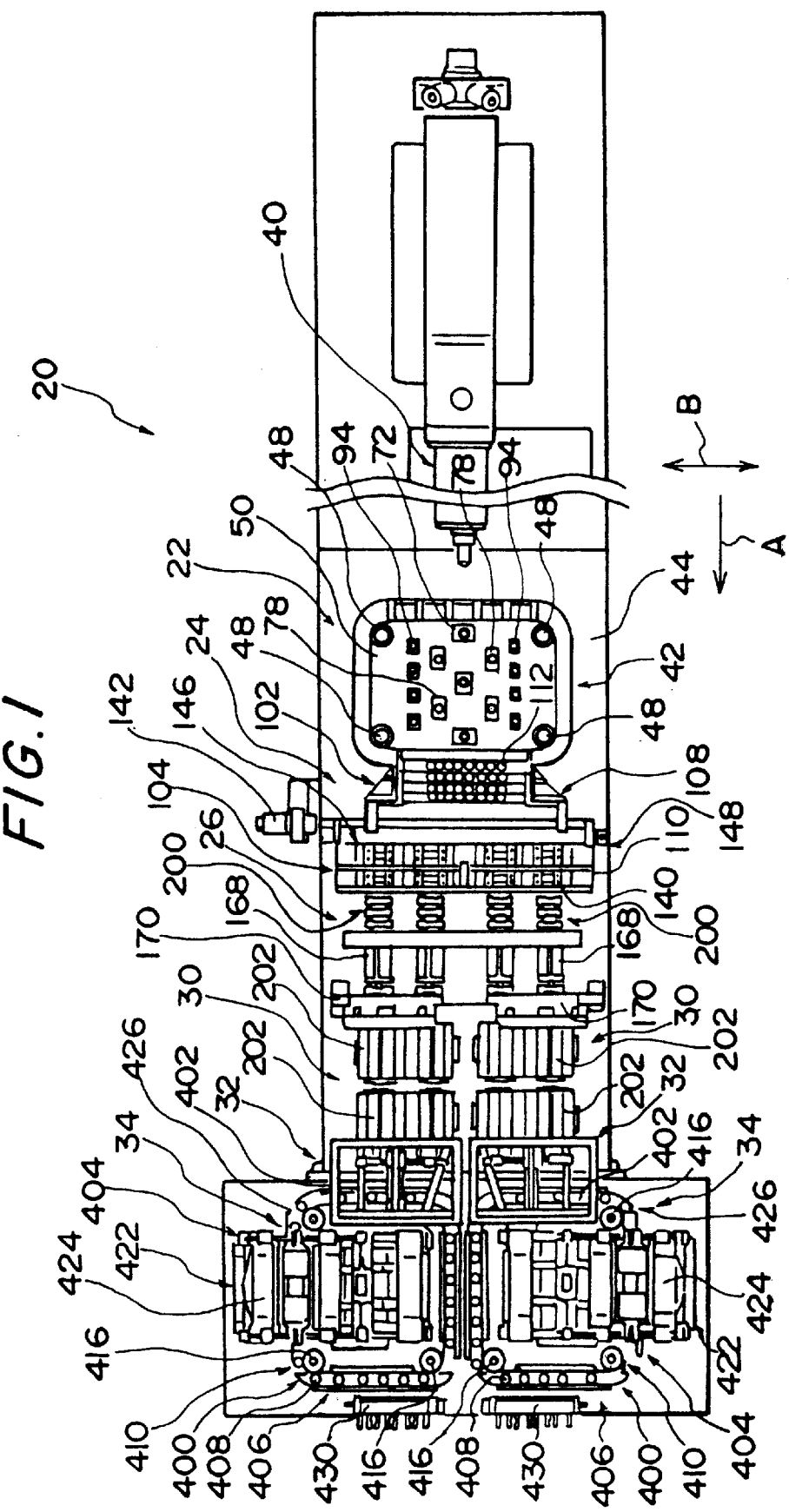
FIG. 1 is a plan view of one embodiment of an injection blow molding system constructed in accordance with the present invention.

FIG. 1 is a plan view showing the entire layout of the injection blow molding system 20.

The injection blow molding system 20 comprises an injection molding station 22, a first delivering section 24, a cooling station 26, a heating station 30, a second delivering section 32 and a blow molding station 34, all of which are arranged linearly in a first direction A in which preforms 36 are carried.

Figure 2:
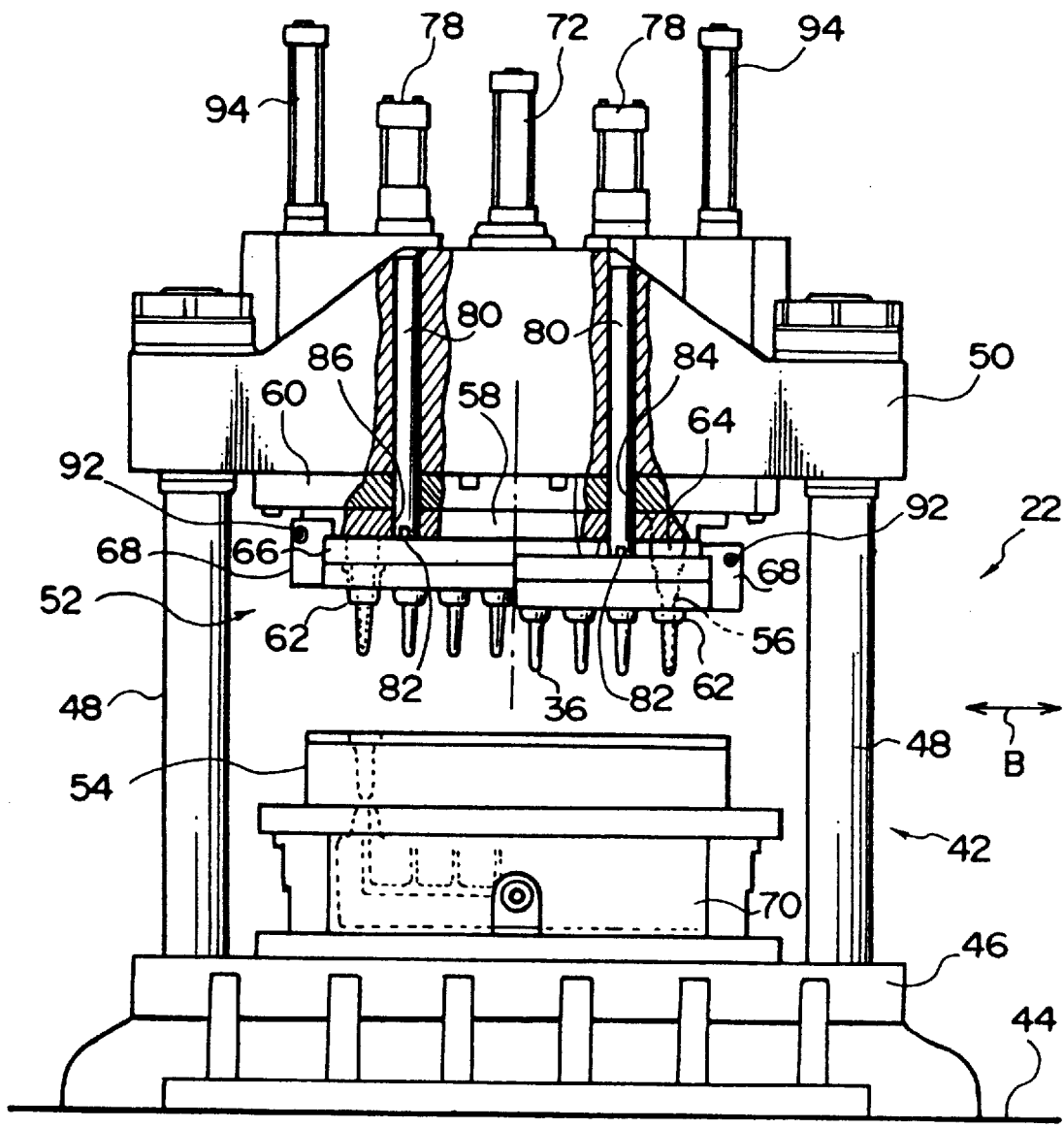
FIG. 2 is a side view of the injection molding station as viewed from the side of the injection device in FIG. 1.
Figure 3:
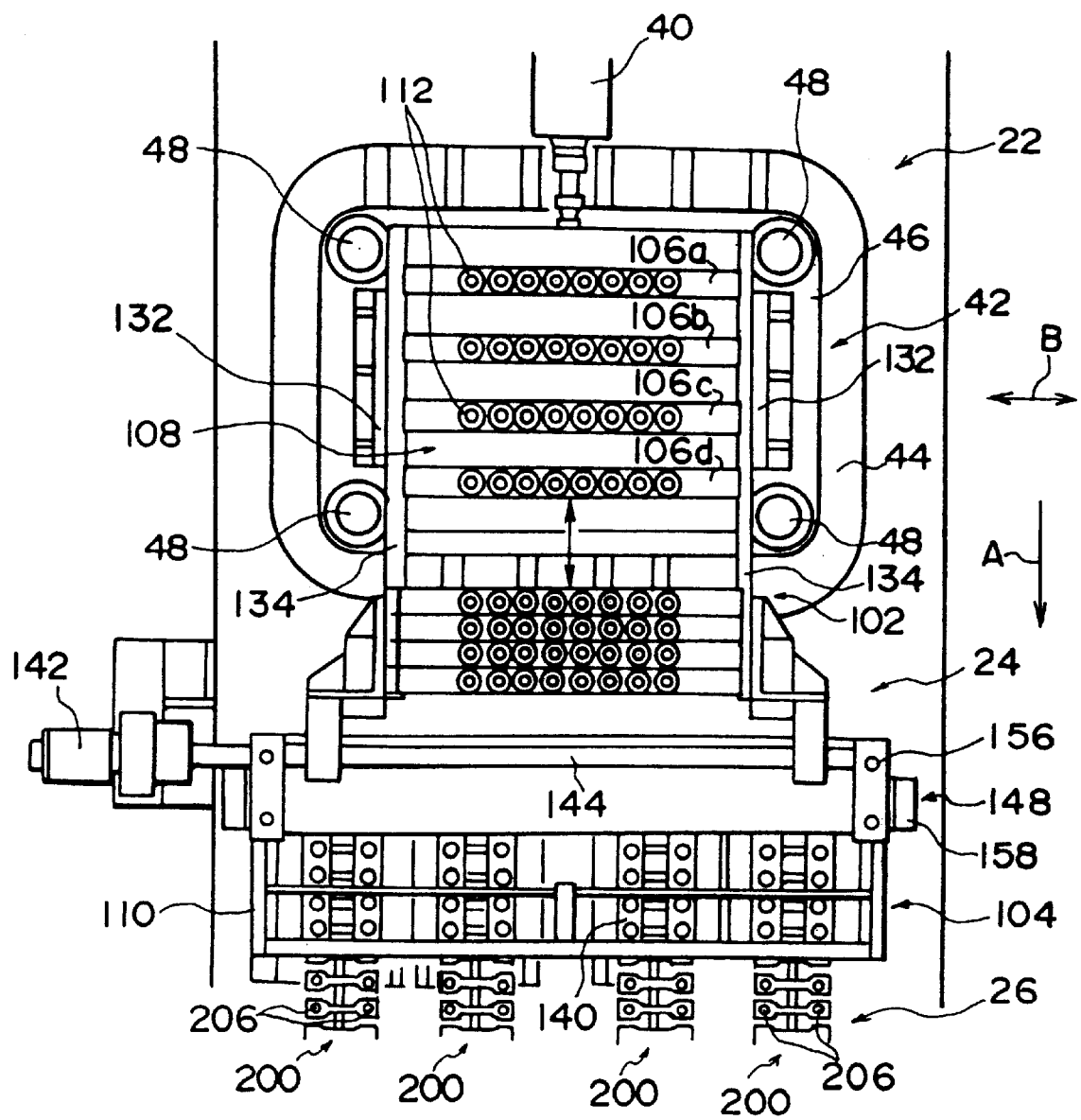
FIG. 3 is an enlarged view of the injection molding station and first delivering section of the injection blow molding system shown in FIG. 1, with the upper mold clamping plate being omitted.
Figure 5:
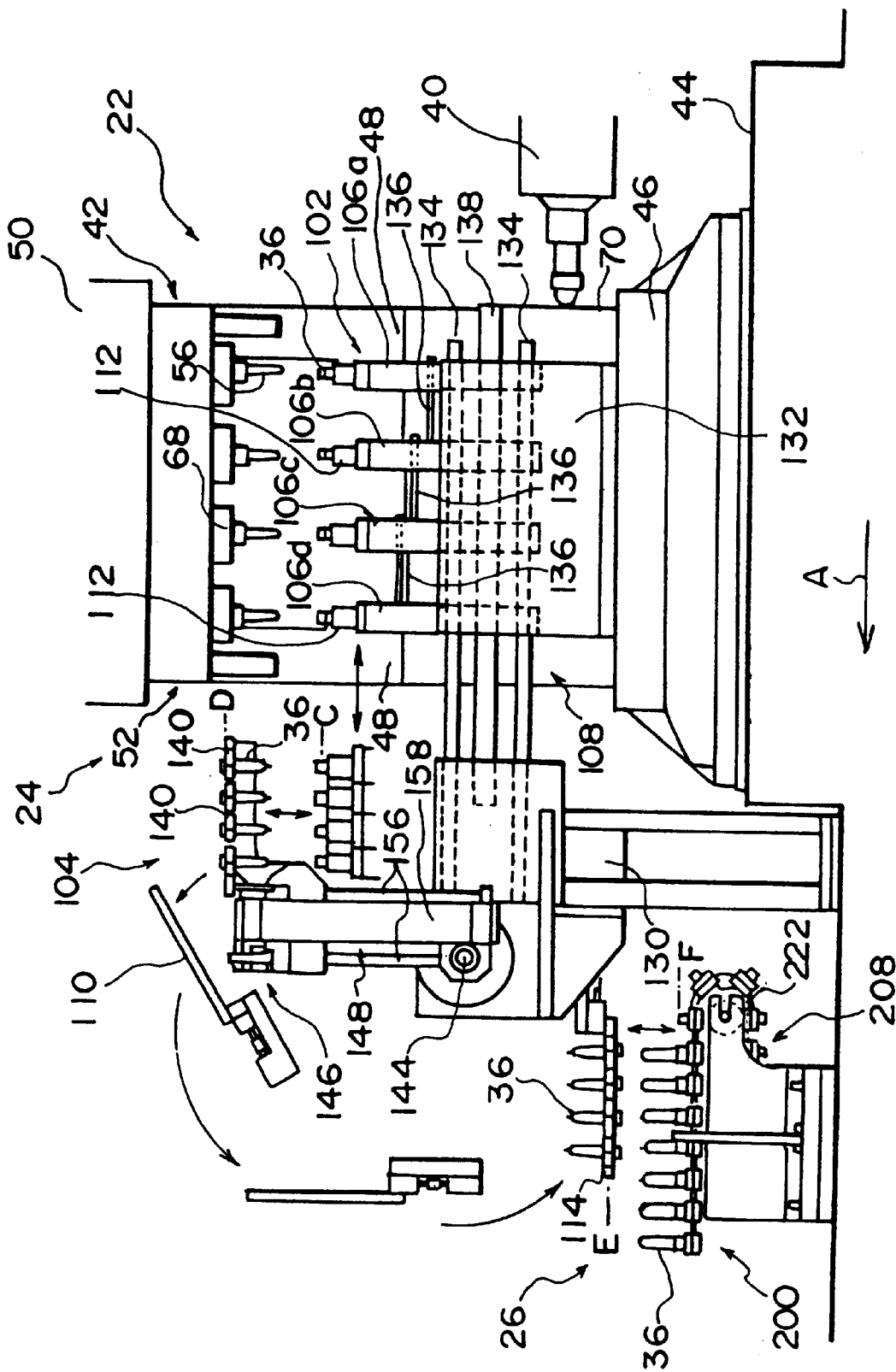
FIG. 5 is a side view of the first delivering section of FIG. 1.
Figure 6:
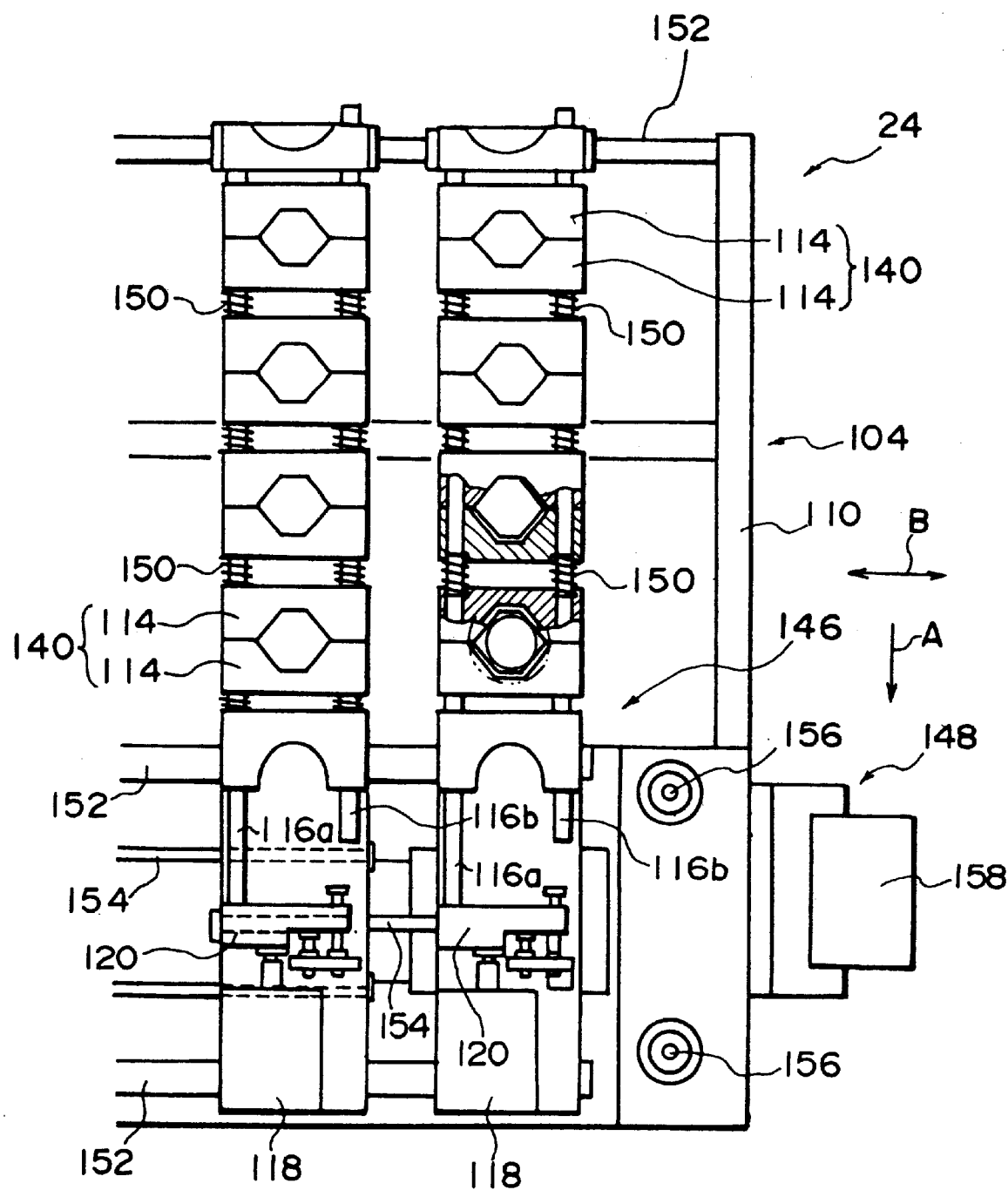
FIG. 6 is a partial enlarged plan view of the holding members of the inverting mechanism.

The injection molding station 22 includes an injection molding device 42 connected to an injection device 40 wherein an M rows ($M \geq 2$)×N columns ($N \geq 2$) matrix of preforms 36 is simultaneously injection molded with one row extending in a second direction B perpendicular to the first or preform carrying direction A (also see FIGS. 2, 3 and 5). In this embodiment, N is equal to 8 while M is equal to 4. Thus, the M×N matrix includes 32 preforms 36.

As shown in FIG. 2 (in which the first delivering section is omitted) and FIG. 5, the injection molding device 42 comprises a lower mold clamping plate 46, an upper mold clamping plate 50 connected to the lower mold clamping plate 46 by a clamping cylinder (not shown) through four tie-bars 48, the clamping cylinder being capable of driving the upper mold clamping plate 50 toward or away from the lower mold clamping plate 46, and an injection mold device 52 mounted between the lower and upper mold clamping plates 50, 46.

The injection mold unit 52 comprises an injection cavity mold 54, injection core molds 56, an injection core mold fixing plate 58, an injection core mold holding plate 60, split neck cavity molds 62, a neck mold fixing plate 64, a stripper plate 66 and neck mold fixing plate guide rails 68.

The injection cavity mold 54 includes 32 cavities for simultaneously molding four rows of eight preforms 36 and is mounted on the stationary or lower mold clamping plate 46 through a hot runner 70 which communicates with the injection device 40.

The number of the injection core molds 56 is equal to that of the cavities in the injection cavity mold 54. These injection core molds 56 are mounted on the injection core mold fixing plate 58 for movement relative to the injection cavity mold 54.

The injection core mold fixing plate 58 is mounted on the movable or upper mold clamping plate 50.

The injection core mold holding plate 60 is mounted on the injection core mold fixing plate 58 between the injection core mold fixing plate 58 and the upper mold clamping plate 50.

The number of the split neck cavity molds 62 is equal to that of the injection core molds 56. Each of the split neck cavity molds 62 is of a split type which can be closed relative to the corresponding injection core mold 56.

The neck mold fixing plate 64 includes divided plates each of which holds the respective split mold portion of eight split neck cavity molds 62 in one row.

The stripper plate 66 is located between the neck mold fixing plate 64 and the injection core mold fixing plate 58 for movement relative to the injection core mold fixing plate 58. More particularly, the stripper plate 66 is connected to the bottom end of a stripper plate elevating rod (not shown) in a stripper plate elevating cylinder 72 which is mounted on the upper mold clamping plate 50. When this stripper plate elevating rod is actuated, the stripper plate 66 can be moved toward or away from the injection core mold fixing plate 58. The stripper plate 66 includes an engagement portion 82 which rates with the bottom end of a releasing rod 80 in a hydraulic releasing cylinder 64 on the upper mold clamping plate 50. When the stripper plate 66 is moved downward relative to the neck mold fixing plate 64, the stripper plate 66 can release the preforms 36 out of the injection core molds 56. Bores 84 and 86 are formed through the injection core mold holding and fixing plates 60, 58 for slidably receiving the stripper plate elevating and releasing rods 80. The downward movement of the stripper plate 66 is limited by stopper rods (not shown) mounted on the underside of the upper fixing plate 50 so that the preforms 36 will not be completely drawn out of the injection core molds 56. Bores for receiving the stopper rods are formed through the injection core mold holding plate 60, injection core mold fixing plate 58 and stripper plate 66.

Each of the neck mold fixing plate guide rails 68 comprises divided members which are mounted on the respective divided plates forming the neck mold fixing plate 64. The neck mold fixing plate guide rails 68 are slidably engaged by the stripper plate 66 so that the neck mold fixing plate 64 can be slidably moved to open the injection core molds 62. The divided members in the neck mold fixing plate 68 are biased to close the injection core molds 62 through biasing means 92 such as springs. The top of each of the divided members includes a wedge bore (not shown) formed therein to receive a corresponding neck mold opening cam (not shown) which is connected to a neck mold opening cylinder 94 on the upper mold clamping plate 50. When these neck mold opening cams are inserted into the respective wedge bores to open the neck mold fixing plate guide rails, the split neck cavity molds 62 can be opened. Bores for receiving the neck mold opening cams are formed through the injection core mold holding and fixing plates 60, 58.

When in the injection molding station 22 a mold clamping/driving cylinder within the bed is actuated to move the upper mold clamping plate 50 of the injection molding device 42 downward through the tie-bars 48, the neck mold fixing plate 64, stripper plate 66, injection core mold fixing plate 58 and injection core mold holding plate 60 are moved to be stacked on the injection cavity mold 54 so that the injection cavity molds 54, injection core molds 56 and split neck cavity molds 62 are closed. When a resin material is injected from the injection device 40 into the cavities of the injection cavity mold 54, four rows of eight preforms in the direction B perpendicular to the preform carrying direction A can be simultaneously injection molded.

After the injection molded preforms 36 have been cooled for a given time, a mold clamping/driving cylinder (not shown) is then actuated to move the upper mold clamping plate 50 upward to release the preforms 36 out of the injection cavity mold 54.

The hydraulic releasing cylinder 78 is then actuated to engage the bottom end of the releasing rod 80 with the stripper plate 66. Thus, the stripper plate 66 is slightly downward moved relative to the injection core mold fixing plate 58 to form a gap between each preform 36 and the corresponding injection core mold 56. Therefore, the preforms 36 can be released while the necks thereof are being held relative to the injection core molds 56 by the split neck cavity molds 62.

When the stripper plate elevating cylinder 72 is actuated while the preforms 36 are in their released state out of the injection core molds 56, the bottom end of the stripper plate elevating rod is downward moved to lower the stripper plate 66.

It is preferred that the stripper plate 66 is stopped at its lowermost limit by the stopper rods 88 so that the preforms 36 will not be completely drawn out of the injection core molds 56.

At the lowermost limit of the stripper plate 66, the neck mold opening cylinder 94 is actuated to lower the neck mold opening cams so that they will be inserted into the wedge bores in the top of the neck mold fixing plate guide rails 68 to open the guide rails 68. Thus, the neck mold fixing plate 64 then opens the split neck cavity molds 62. At this time, the necks of the preforms 36 will be released from the split neck cavity molds 62. As a result, the molded preforms will fall down and be removed out of the system.

Since the injection core molds 56 remain within the respective preforms 36, the latter can fall down without maintaining their centered position.

As shown in FIGS. 3–6, the first delivering section 24 is designed to receive plural rows of upright preforms 36 from the injection molding station 22 and to deliver the inverted preforms 36 to the cooling station 26. The first delivering section 24 comprises a removing mechanism 102 and an inverting mechanism 104.

The removing mechanism 102 comprises four removing plates 106a, 106b, 106c and 106d extending in the direction B perpendicular to the preform carrying direction A, and a row pitch changing mechanism 108 for reducing the row pitch between the respective row of preforms that have been removed by the removing plates 106a, 106b, 106c and 106d.

Each of the removing plates 106a, 106b, 106c and 106d has eight cylindrical receiving members 112 which can receive and hold parts of the preforms with a spacing corresponding to the spacing between the preforms 36 of one row in the injection molding station 22.

Each of the receiving members 112 has its height sufficient to move into the injection molding station 22 without interference with the preforms 36 at least on the mold opening stage and to receive the parts of the preforms 36 when the neck molds are moved downward. When the receiving members 112 are retracted from the injection molding station 22, the inverting mechanism 104 can easily and reliably hold the parts of the preforms 36 adjacent to their necks while exposing them and can also support at least parts of the preform bottom and barrel portions so that the preforms will not be inclined or the necks thereof will be changed in position. It is also preferred that each of the receiving members 112 is in the form of a cylinder having the same internal diameter as the barrel diameter of the preforms 36.

When the preforms 36 are released and fall out of the split neck cavity molds 62, they will be received simultaneously by the receiving members 112.

Removing rails 134 are disposed on the opposite sides of the injection cavity mold 54 and between the tie-bars 48 and extend from the injection molding station 22 to the first delivering section 24. A pair of support plates 132 for supporting the removing rails 134 are fixedly mounted on the lower mold clamping plate 46 between the tie-bars 48.

The row pitch changing mechanism 108 includes a removing mechanism support base 130 located between the injection molding station 22 and the cooling station 26. Two pairs of upper and lower removing rails 134 are mounted between the removing mechanism support base 130 and the removing rail supporting plates 132. The removing rails 134 slidably support the removing plates 106a, 106b, 106c and 106d at their opposite ends.

The removing plates 106a, 106b, 106c and 106d can be stopped and engaged by stopper rods 136 with the row pitch in the injection molded preforms.

A rodless type removing cylinder 138 is disposed between the upper and lower removing rails 134 and is connected to the removing plate 106a. When the removing cylinder 138 is actuated to move the removing plate 106a in the direction opposite to the direction A, the removing plates 106a, 106b, 106c and 106d are arranged to have their pitch equal to that of the injection molded preforms 36 through the stopper rods 136. When the removing plate 106a is moved in the direction A by the removing cylinder 138, the removing plate 106a is urged against the removing plates 106b, 106c and 106d so that the row pitch therein will be reduced.

The inverting mechanism 104 is designed to invert four rows of eight preforms 36 simultaneously removed by the removing mechanism 102 by inverting 32 holding members 140 holding these preforms when an inverting motor 142 on the removing mechanism support base 130 is actuated to rotate inverting arms 110 from the side of the removing mechanism 102 to the side of the cooling station 26 about an inverting shaft 144.

The inverting mechanism 104 comprises a column pitch changing mechanism 146 for moving the holding members 140 to change the column pitch in the direction B perpendicular to the direction A, and an elevator mechanism 148 for elevating the holding members 140 for delivery of the preforms 36.

Each of the holding members 140 comprises a set of two preform holding plates 114 each of which includes notches for holding one preform 36 at the opposed positions. These preform holding plates 114 are supported by four opening/closing rods 116a and 116b extending in the direction A.

More particularly, one of the preform holding plates 114 is supported by the opening/closing rod 116a, the other preform holding plate 114 being supported by the other opening/closing rod 116b. A spring 150 between the holding members 140 of the opening/closing rods 116a and 116b biases the corresponding set of preform holding plates 114 to close them.

When a holding member opening/closing cylinder 118 is actuated to urge an urging plate 120 against the end of the opening/closing rod 116a, the other opening/closing rod 116b is moved in the opposite direction to open the four holding members 140 at the same time. If the urging force is released, the holding members 140 will be closed.

The column pitch changing mechanism 146 is designed to move a set of four holding members 140 arranged in the preform carrying direction A as a unit along a plurality of guide rails 152 extended parallel to the inverting arms 110 in the direction B perpendicular to the preform carrying direction A.

The holding members 140 are grouped into two sets of four holding members 140 about the center. Each set of four adjacent holding members 140 are connected to one another through guide rods 154 so that the holding members 140 will be positioned with a given pitch.

When two sets of four holding members 140 are moved outward away from each other by actuation of two rodless type column pitch changing cylinders 155 provided for each set, the column pitch in the holding members 140 can be changed to another column pitch in the cooling station 26 through the guide rods 154 (the right-hand portion of FIG. 3 showing the row pitch changing state). Thus, the outer set of two leftward and rightward holding members 140 are inward moved and engaged by the inner set of four holding members 140 (the left-hand portion of FIG. 3 showing such an engagement state). The inner set of four holding members 140 is adapted to be positioned in place by engaging them with stopper means 154 on the column pitch changing stage. The column pitch changing or returning operation is adapted to be performed during the inverting or returning operation in the inverting mechanism 104.

The elevator mechanism 148 comprises elevator guide rods 156 for elevatingly supporting the inverting arms 110 and an elevator cylinder 158 for elevating the inverting arms 110 along the elevator guide rods 156.

As will be apparent from FIG. 5, the elevator mechanism 148 is designed to move up or down the holding members 140 between a position C in which the holding members 140 hold the preforms 36 on the receiving members 112 and another position D in which the preforms 36 are removed out of the receiving members 112 and also between an after-inversion delivery stand-by position E and a delivery position F.

When the holding members 140 are in the position D in which the preforms 36 are removed while being held and if the inverting mechanism 104 is actuated to invert the holding members 140, the holding members 140 will be positioned directly at the delivery position F. On the way of the inverting step, therefore, the holding members 140 are moved upward to position at the delivery stand-by position E through the elevator mechanism 148. In of the returning step, by contrast, the holding members 140 are moved to the removing position D to avoid any interference so that the holding members 140 will not be moved directly to the holding position C from the delivery stand-by position E during the re-turning step.

Because the removing mechanism 102 receives the injection molded preforms 36 after the row pitch thereof has been reduced by the row pitch changing mechanism 108 and because the inverting mechanism 104 inverts and delivers the preforms 36 to the cooling station 26 after the column pitch in the inverted preforms 36 has been changed to the carrying pitch in the cooling station 26 while maintaining the reduced row pitch therein, the pitch of the preforms 36 in the direction in which they are carried in the cooling station 26 can be reduced to improve the efficiency on carrying.

Since the simultaneously molded preforms are simultaneously delivered from one station to another station while the column pitch changing and elevating operations are simultaneously performed during the inverting operation, time required to deliver the preforms and thus the molding cycle can be reduced.

As shown in FIG. 1, the cooling station 26 is designed to cool four rows of 32 inverted preforms 36 received from the first delivery section 24 with their reduced row pitch while intermittently carrying the preforms 36. Thus, the cooling station 26 comprises a plurality (e.g., four) of first carrying paths 200, a cooling mechanism 168 located on the middle of each of the first carrying paths 200 and a rotation mechanism 176.

The first carrying paths 200 are shared by the heating station 30 and extend between the first delivery section 24 and the second delivery section 32. Each of the carrying paths 200 includes a plurality of first carrying members 206 each for supporting an inverted preform 36 from the first delivery section 24, and a first carrying mechanism 208 for intermittently carrying the first carrying members 206 to the second delivery section 32 in the preform carrying direction A.

There are a plurality of first carrying member pairs 206 which are spaced away from one another with a given spacing in the preform carrying direction A. In each of the first carrying member pairs, two carrying members 206 are spaced away from each other on the respective first carrying path 200 in the preform carrying direction A.

Figure 7:
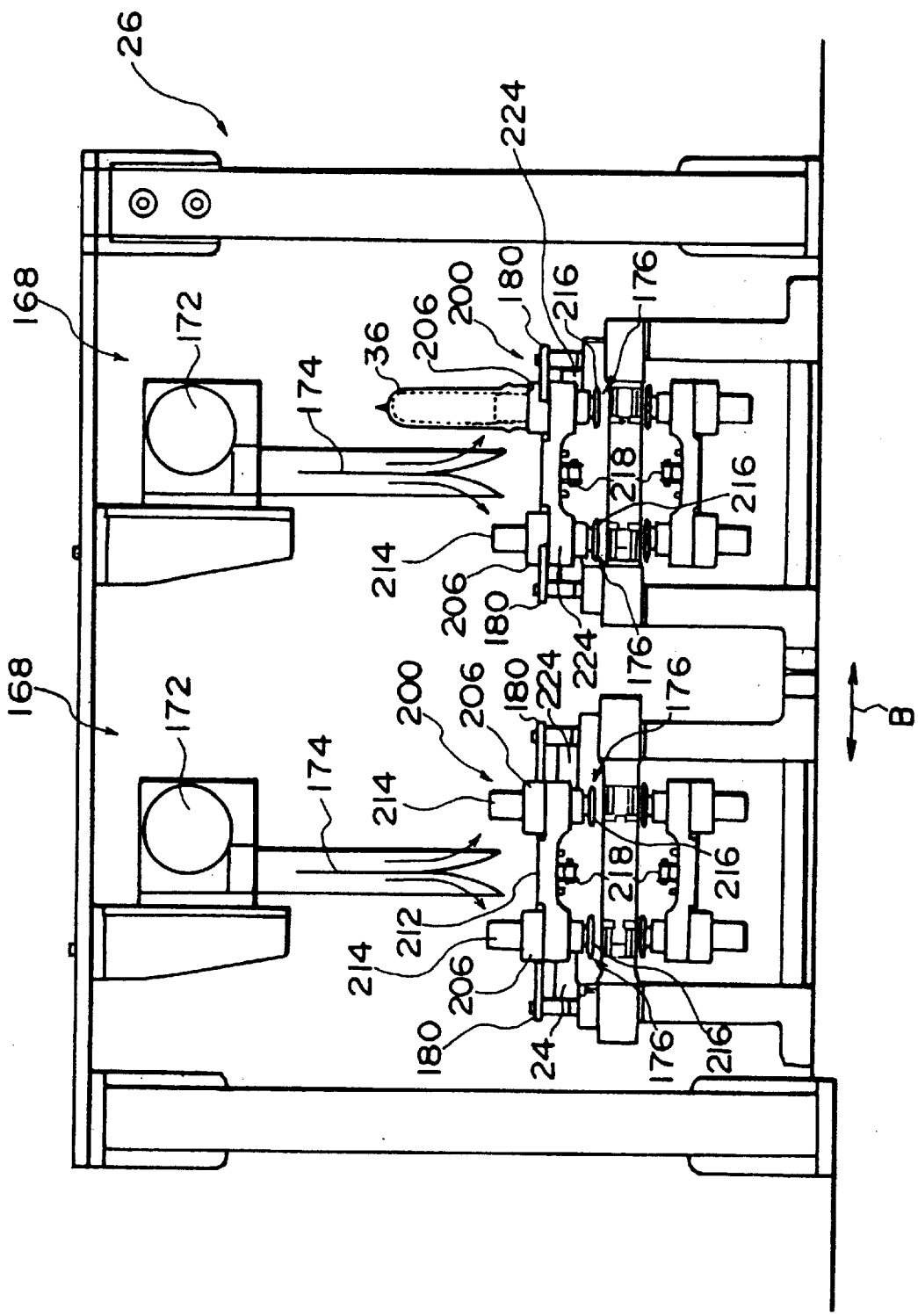
FIG. 7 is a front view of the cooling mechanisms and first carrying paths in FIG. 1.

As shown in FIG. 7, each of the first carrying member pairs 206 is rotatably mounted on a bracket 212. Each first carrying member 206 includes a preform supporting portion 214 extended outward from the top thereof. The preform supporting portion 214 is designed to be inserted into the neck of a corresponding preform 36 so that it can be supported in its inverted state. Each of the first carrying members 206 includes a rotation sprocket 216 mounted thereon at the bottom end, the rotation sprocket 216 forming part of the rotation mechanism. When a first carrying member 206 is in the first delivery position of the preforms 36, that first carrying members 206 can be positioned to receive the preforms 36 by a positioning side plate 180. Thus, the preforms 36 can be reliably delivered to the respective carrying members 206.

Each of the first carrying mechanisms 208 comprises a first carrying chain 218 and a first carrying actuator (not shown).

Each of the carrying chains 218 is disposed between two first carrying members 206 to extend in the preform carrying direction A. The carrying chain 218 is supported by a driven sprocket 222 on the side of the cooling station 26 and also supported by a drive sprocket (not shown) connected to the first carrying actuator on the side of the second delivery section 32. The first carrying chain 218 is fixedly connected to the middle of each of the bracket 212 on which the first carrying member pair is mounted. Each of the brackets 212 is guided by first carrying rails 224 which are disposed to extend in the respective first carrying paths 200.

The rotation mechanism 176 is designed to rotate the preforms 36 about their longitudinally axes so that they can be uniformly cooled around the circumference thereof. The details thereof will be described together with a rotation mechanism in the heating station 30 later.

As shown in FIG. 7 (in which only the cooling mechanisms in two first carrying paths are shown), each of the cooling mechanism 168 includes a cross-flow type cooling fan 172 which is located above the corresponding first carrying path 200 and extends in the preform carrying direction A, and a guide plate 174 located below the cooling fan 172 for conducting a cooling air toward the preforms 36 on two rows of first carrying members 206. This guide plate 174 is also located between two rows of preforms 36 to direct the cooling air from the cooling fan 172 toward the side walls of each of the preform rows.

Figure 9:
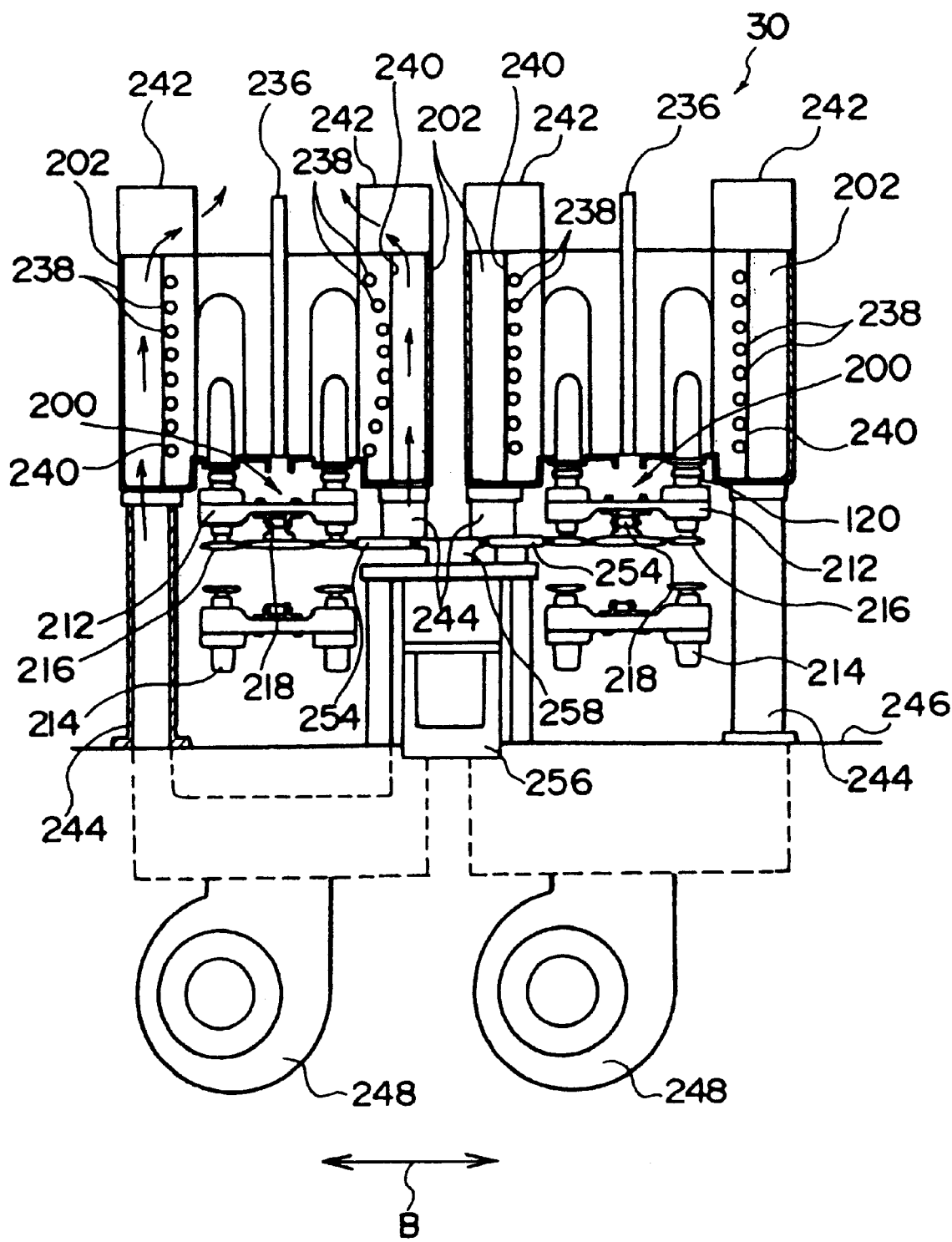
FIG. 9 is a cross-sectional view illustrating the heating boxes in the heating station of FIG. 1.

As shown in FIGS. 1 and 9, the heating station 30 is designed to heat the preforms 36 after they have been cooled by the cooling station 26 and comprises two heating station units 30 disposed parallel to each other.

Each of the heating station units 30 comprises a first carrying path 200 shared by the cooling station 26, heating boxes 202 and a rotation mechanism 204.

There are two sets of two heating boxes 202 which are disposed on the opposite sides of the first carrying path 200 and upstream and downstream in the preform carrying direction A.

A gap corresponding to one row of the preforms 36 is provided between the upstream and downstream heating boxes 202. At this gap, one row of the preforms 36 is temporarily stopped to reduce any difference of temperature between the inner and outer walls of the preform 36 after it has been heated by the upstream heating box 202 and before it is supplied to the downstream heating box 202.

The spacing between the upstream and downstream heating boxes 202 may be varied depending on the wall-thickness in the preforms 36.

Each set of two heating boxes 202 includes a reflecting or shielding plate 236 extending therebetween in the preform carrying direction A for shielding two preforms 36 from each other.

Each of the heating boxes 202 includes a plurality of heaters 238 which extend in the preform carrying direction A and are arranged vertically in the axial direction of the preforms 36. Each of these heaters 238 is supported for forward and backward movement relative to the preforms 36, as shown in the second heating box 202 counted from the left end of FIG. 14. Thus, the temperature profile along the length of the preforms 36 can be regulated.

Each heating box 202 includes a reflecting plate 240 behind the heaters 238 and a terminal base 242 provided on the top thereof. The bottom of the heating box 202 is supported on a bed 246 through a hollow support leg 244 which communicates with the interior of the heating box 202. The support leg 244 is also connected to a blower 248 which is mounted within the bed 246.

A cooling air is supplied from the blowers 248 to the interior of the heating boxes 202 behind the reflecting plates 240 through the support legs 244, the cooling air being then moved to the upper parts of the heating boxes 202. Thus, the reflecting plates 240 can be prevented from being overheated resulting in prolongment of the service life in the reflecting plates 240. The cooling air can cool the terminal bases 242 and also the opposite supported ends of the heaters 238 extending in the preform carrying direction A. This can further prolong the service life in the heaters.

The rotation mechanism 204 is designed to heat the preforms 36 uniformly around the circumference thereof and independent of the rotation mechanism 176 in the cooling station 26.

Figure 10:
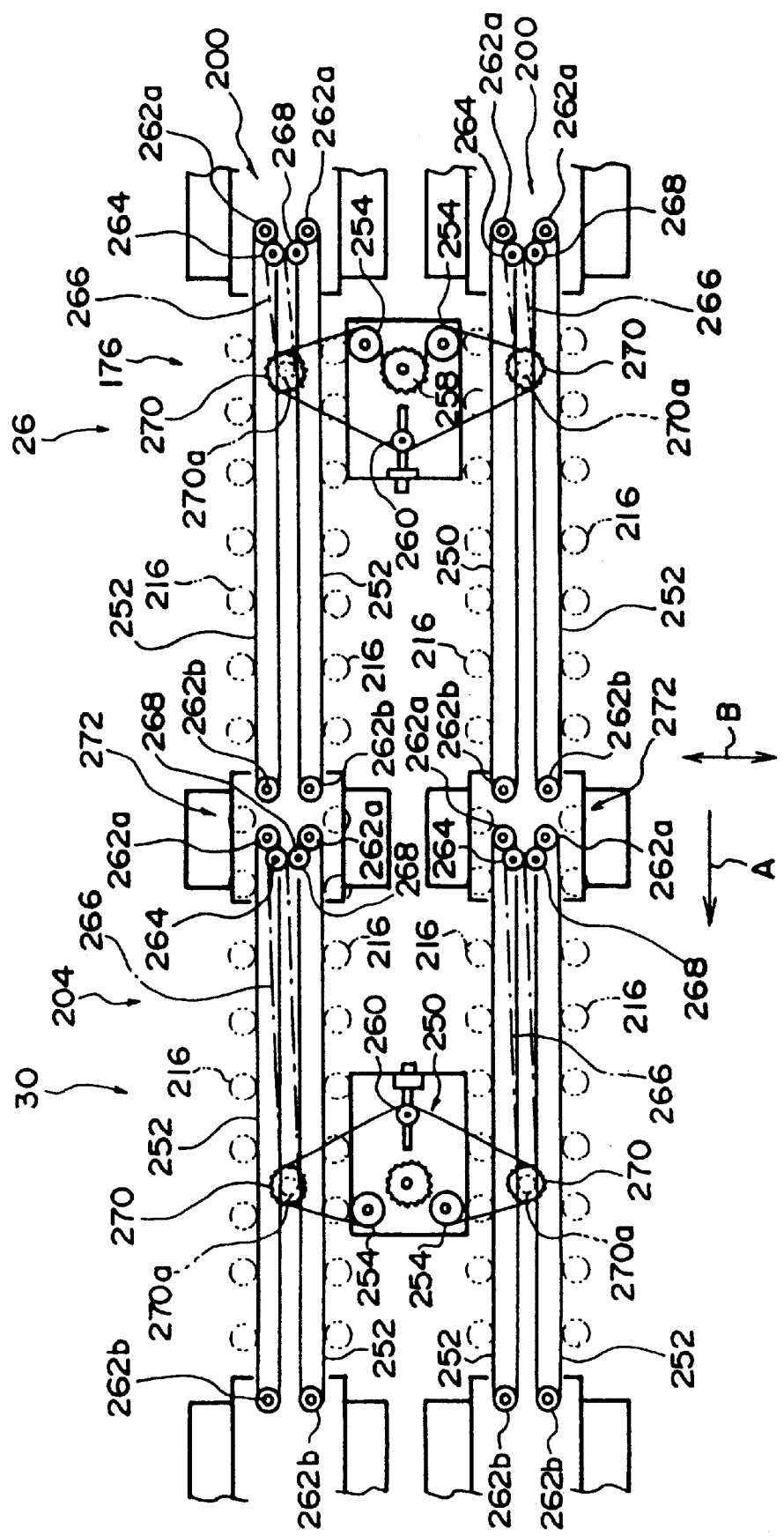
FIG. 10 is a schematic plan view of the rotation mechanism in the cooling and heating stations.

The rotation mechanisms 176 and 204 in the cooling and heating stations 26, 30 are of a structure similar to each other as shown in FIG. 10. FIG. 10 shows only two first carrying paths 200, but it will be apparent that the other two first carrying paths 200 are of the same structure.

Each of the rotation mechanisms 176 and 204 comprises a first rotation chain 250 shared by two first carrying paths 200 and two second rotation chains 252 extending on each first carrying path 200 in the preform carrying direction A.

The first rotation chain 250 is spanned between two first carrying paths 200 and passed around four driven sprockets 254, 270, a drive sprocket 258 operatively connected to a rotation motor (not shown) and a biasing sprocket 260. Each of the two driven sprockets 270 includes a cooperative sprocket 270a integrally formed thereon.

Each of the second rotation chains 252 is spanned between and passed around two sprockets 262a and 262b and in operative engagement with rotation sprockets 216 on the first carrying members which are being carried in one line on each of two first carrying paths 200.

The sprocket 262a in one of two second rotation chains 252 on each of the first carrying paths 200 is operatively connected to the respective cooperative sprocket 264 through a gearing (not shown). The cooperative sprocket 264 is further operatively connected to the sprocket 262a in the other second rotation chain 252 through a cooperative gear 268.

The cooperative sprocket 270a on each of the driven sprockets 270 is operatively coupled to each of the cooperative sprockets 264 in each first carrying path 200 through a cooperative chain 266.

When the rotation motor is initiated to rotate each of the drive sprockets 258 clockwise, the two sprockets 262a in each first carrying path 200 are rotated through the first rotation chain 250, driven sprocket 270, cooperative sprocket 264, cooperative gear 268 and others. Thus, each of the second rotation chains 252 is moved in a direction as shown by arrow to rotate the first carrying member rotating sprockets 216 engaging the second rotation chain 252 in the opposite direction to the preform carrying direction A. As a result, the preforms will be rotated about their longitudinal axes.

A non-rotation area 272 is formed between the cooling and heating stations 26, 30 in each of the carrying paths 200. Each of the non-rotation areas 272 includes a gate cutting mechanism 170.

Figure 8:
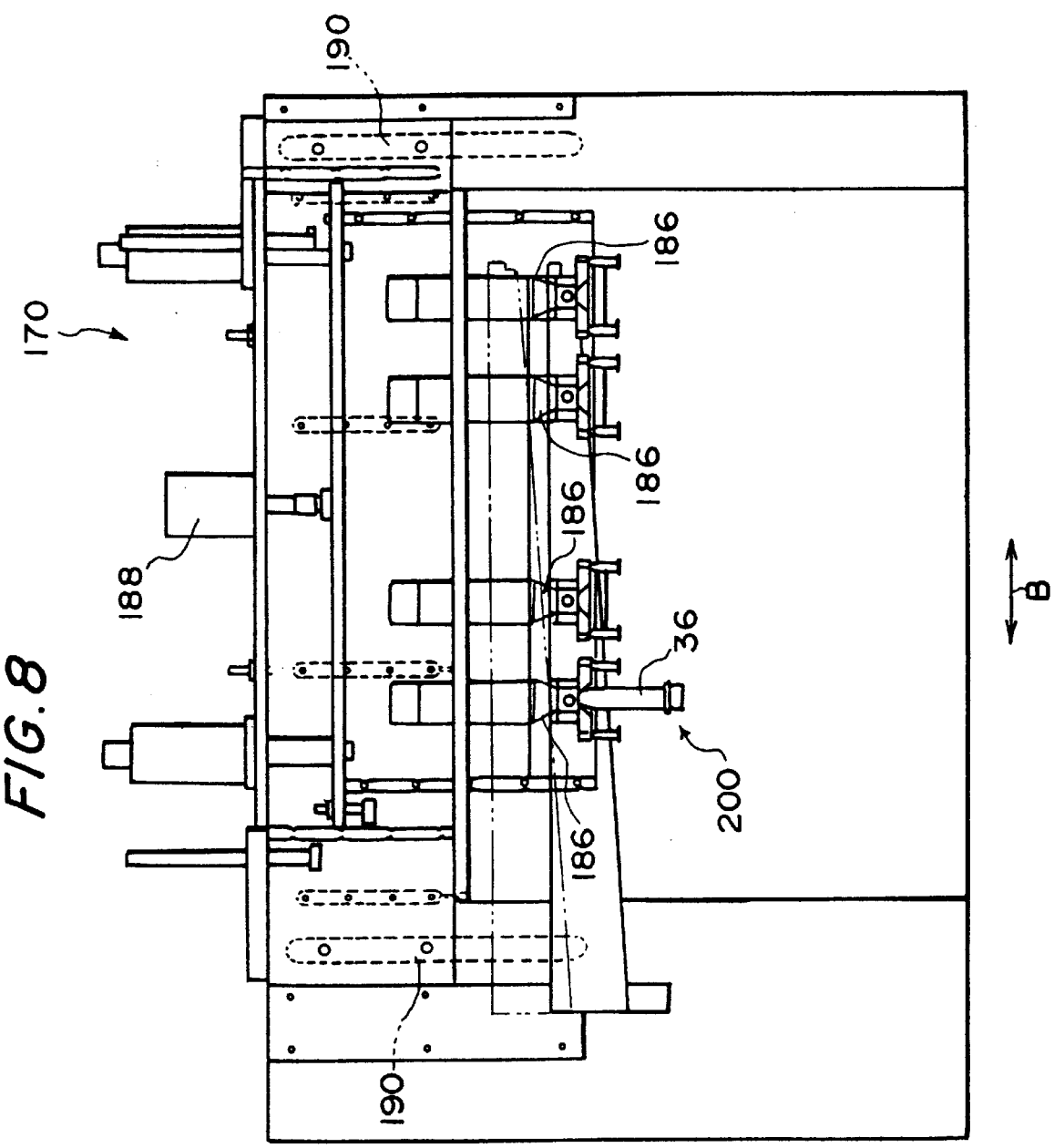
FIG. 8 is a front view of the gate cutting mechanism in FIG. 1.

Each of the gate cutting mechanisms 170 comprises four gate cutters 186 located above the corresponding first carrying path 200 and a gate cutter elevator mechanism 188 for elevating these gate cutters 186, as shown in FIG. 8 which only shows the gate cutter mechanisms corresponding to two of the four first carrying paths).

When the preforms 36 intermittently carried by the first carrying members 206 are stopped at the position of the gate cutters 186, the gate cutter elevator mechanism 188 is actuated to lower the gate cutters 186 for cutting the bottom gates of the preforms 36 from above the performs 36. The height of the gate cutters 186 may be suitably adjusted by an adjustment mechanism 190 depending on the size of the preforms 36.

As shown in FIG. 1, there are two second delivery sections 32 which are disposed parallel to each other in the heating stations 26. Each of the second delivery sections 32 is designed to deliver the preforms 36 from the corresponding heating station 26 to the corresponding blow molding station 34.

Figure 11:
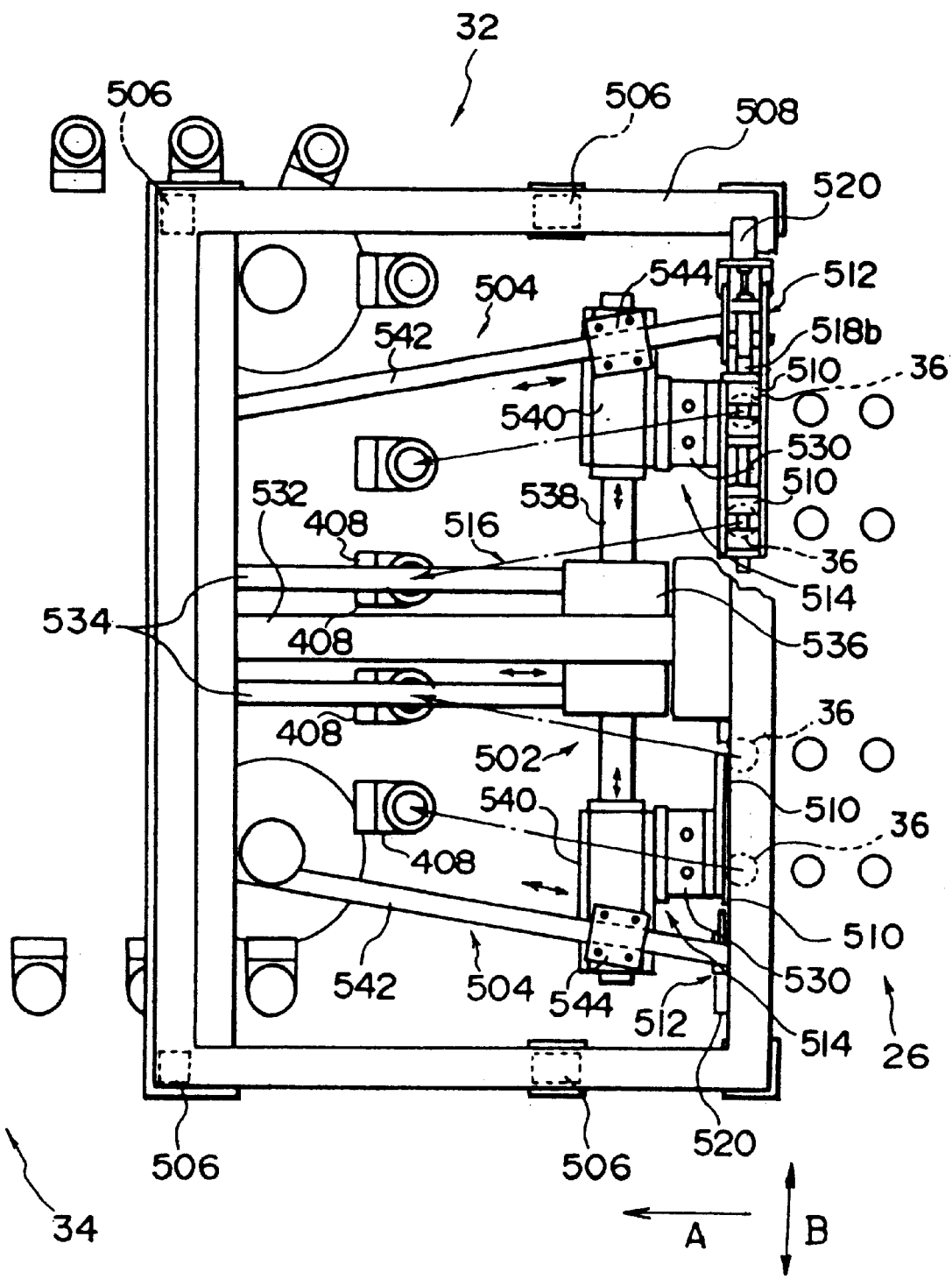
FIG. 11 is an enlarged plan view of the second delivering section of FIG. 2.
Figure 12:
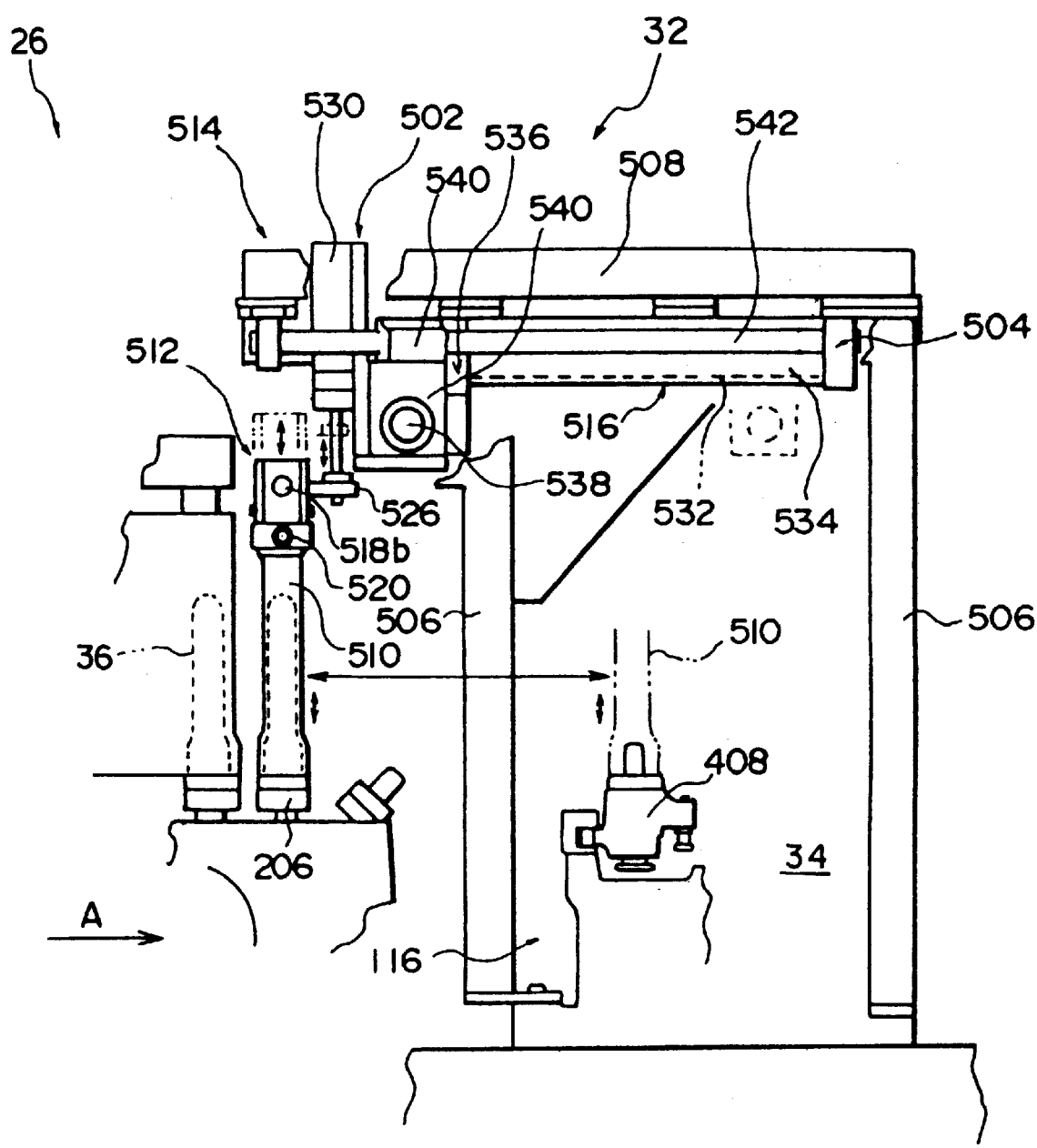
FIG. 12 is a partially cut-away side view of FIG. 11.
Figure 13:
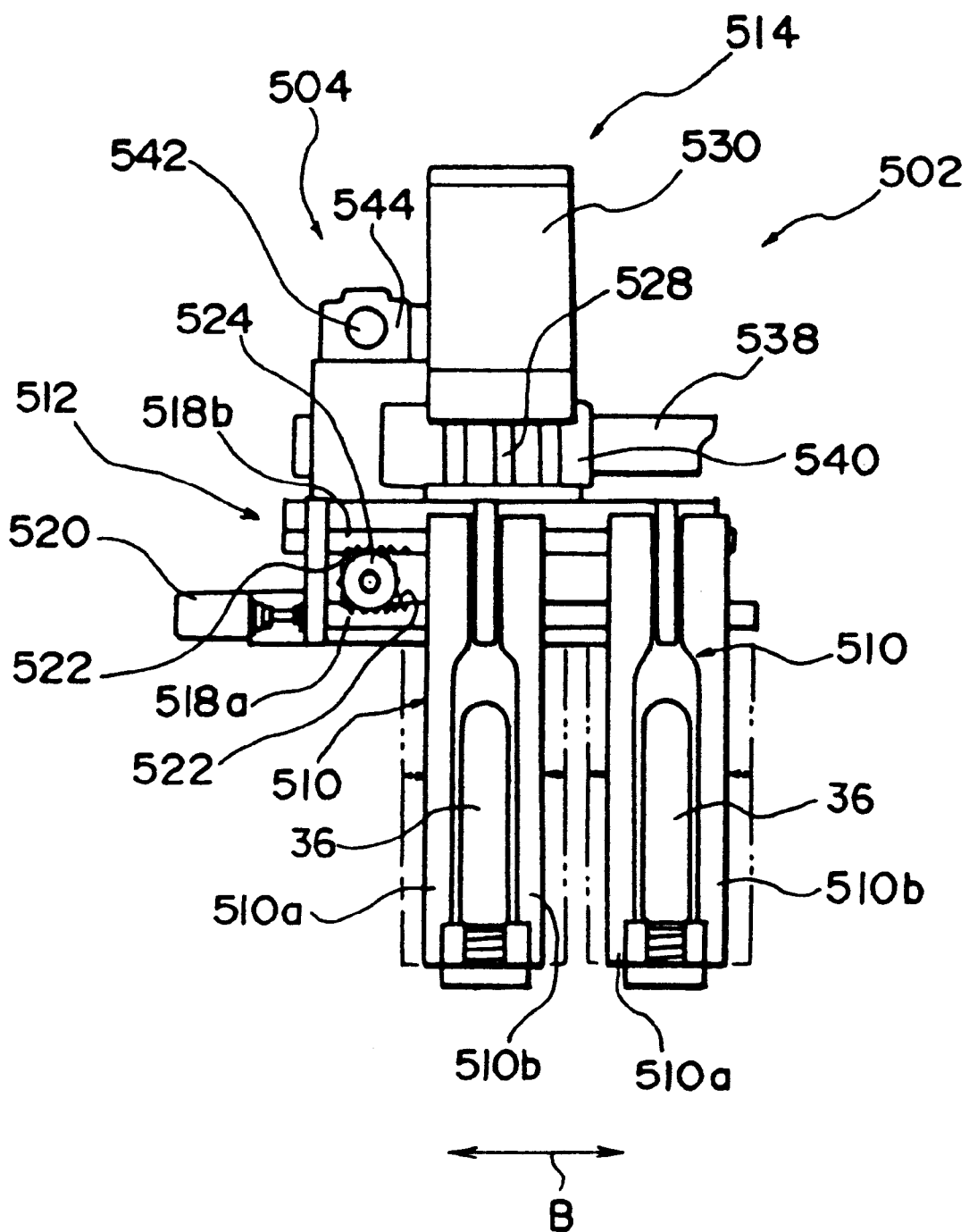
FIG. 13 is a fragmentary front view of the gripping members of FIG. 11.

As shown in FIGS. 11 to 13, each of the delivery sections 32 comprises a transfer mechanism 502 for transferring four preforms 32 heated by the corresponding heating station 30 to the corresponding blow molding station 34 in their inverted state, and a pitch changing mechanism 504 for changing the pitch in the inner two preforms 36 in one row of four preforms 36 on the corresponding first carrying path 200 to a blow molding pitch in the corresponding blow molding station 34 without changing the pitch between the preforms 36 on two first carrying paths within the corresponding heating station 30.

The transfer and pitch changing mechanisms 502, 504 are mounted on a frame 508 which is supported by supports 506 above the transfer area.

Each transfer mechanism 502 comprises gripping members 510 for gripping the necks of the preforms 36, a gripping member opening/closing mechanism 512 for opening/closing the gripping members 510 to grip/release the preforms 36, an elevator mechanism 514 for elevating the gripping members 510, and a movement mechanism 516 for moving the gripping members 510 from the gripping position adjacent to the corresponding heating station 510 to the receiving position adjacent to the corresponding blow molding station 34.

Each of the gripping members 510 comprises a pair of gripping arms 510a and 510b which are disposed opposed to each other for gripping the neck of a preform 36. There are two pairs of such gripping members 510 which are provided for the preforms 36 carried along the two carrying paths 200. The pair of gripping arms 510a and 510b in each of the gripping members 510 are disposed spaced away from each other in the vertical direction. The lower ends of each of the gripping arm pairs 510a and 510b are designed to grip the neck of a preform 36.

There are a pair of the gripping member opening/closing mechanisms 512 which can open/close two sets of gripping members 510 corresponding to the preforms 36 carried along each of the first carrying paths 200.

Each of the gripping member opening/closing mechanisms 512 is designed to open/close the gripping,arms 510a and 510b in each of the gripping members 510 for gripping/ releasing the preforms 36 and thus comprises a pair of slide rods 518a and 518b disposed parallel to each other in the vertical direction and a gripping member opening/closing cylinder 520.

One of the slide rods 518a fixedly supports one of the gripping arms 510a and slidably extends through the other gripping arm 510b. The other slide rod 518b slidably extends through the one gripping arm 510a and fixedly supports the other gripping arm 510b. Each of the slide rods 518a and 518b includes a rack portion 522 formed therein adjacent to one end and located opposed to that of the other slide rod. A pinion 524 is located to engage in between these rack portions 522.

The gripping member opening/closing cylinder 520 is connected to the one slide rod 518a. When the cylinder 520 is actuated to slidably move the one slide rod 518a, the other slide rod 518b is moved in the opposite direction through the pinion 524. Thus, the gripping arms 510a and 510b in the gripping member 510 can be opened or closed.

The elevator mechanism 514 is designed to move the gripping members 510 in the vertical direction for removing and delivering the preforms 36 and comprises a support bracket 526 for elevatingly supporting the corresponding gripping member opening/closing mechanism 512 and an elevator cylinder 530 including an elevator rod 528 connected to the support bracket 526. When the gripping member opening/closing mechanism 512 is moved upward, the gripping members 510 are also elevated in the upward direction.

The movement mechanism 516 is designed to move the gripping members 510 from the preform removal position in the respective heating station 30 to the delivery position in the respective blow molding station 34. Thus, the movement mechanism 516 comprises a rodless cylinder 532, movement guide rods 534, movement members 536, a contacting/ separating movement guide rod 538 and contacting/ separating movement members 540.

The rodless cylinder 532 is located in the frame 508 substantially at the center thereof and extends in the preform carrying direction A.

There are a pair of such movement guide rods 534 which are disposed parallel to each other on the opposite sides of the rodless cylinder 532.

Each of the movement member 536 is connected to the rodless cylinder 532 and slidably engaged by the corresponding movement guide rod 534 for movement in the preform carrying direction A.

The contacting/separating movement guide rod 538 is located to extend in the direction B perpendicular to the preform carrying direction A and mounted at its middle on the movement members 536 for movement in the preform carrying direction A.

There are a pair of contacting/separating movement members 540 which are slidably supported by the contacting/ separating guide rod 538 at the opposite ends about the movement guide rods 534.

Each of the contacting/separating movement members 540 is operatively mounted on the corresponding elevator cylinder 530.

When the rodless cylinder 532 is actuated to move the movement members 536 along the respective movement guide rods 534 in the preform carrying direction A, the elevator mechanisms 514 are respectively moved through the contacting/separating movement guide rods 538 and contacting/separating movement members 540. Thus, two gripping members 510 connected to each of the elevator mechanisms 514 through the respective gripping member opening/closing mechanism 512 will also be moved outside of the respective movement guide rod 534 in the preform carrying direction A.

Each of the pitch changing mechanisms 504 comprises a pitch changing guide rod 542 which gradually approaches the corresponding movement guide rod 534 going from the corresponding heating station 30 to the corresponding blow molding station 34. Each of the pitch changing guide rods 542 is connected to the corresponding contacting/separating movement member 540 through a bracket 544 and movably supports this contacting/separating movement member 540.

As each of the movement members 536 is moved in the preform carrying direction A, the corresponding contacting/ separating movement guide rod 538 is also moved to move the corresponding contacting/separating movement member 540 while being guided by the corresponding pitch changing guide rod 542. Thus, the contacting/separating movement members 540 are gradually slidably moved toward each other on the respective contacting/separating guide rods 538. As the gripping members 510 reach the delivery position in the respective blow molding station 34, the pitch between the inner gripping members 510 mounted on the gripping member opening/closing mechanisms 512 is changed to the blow molding pitch.

The blow molding station 34 includes two blow molding station units which can simultaneously blow mold two groups of four preforms 36 heated by the heating station units 26.

Figure 14:
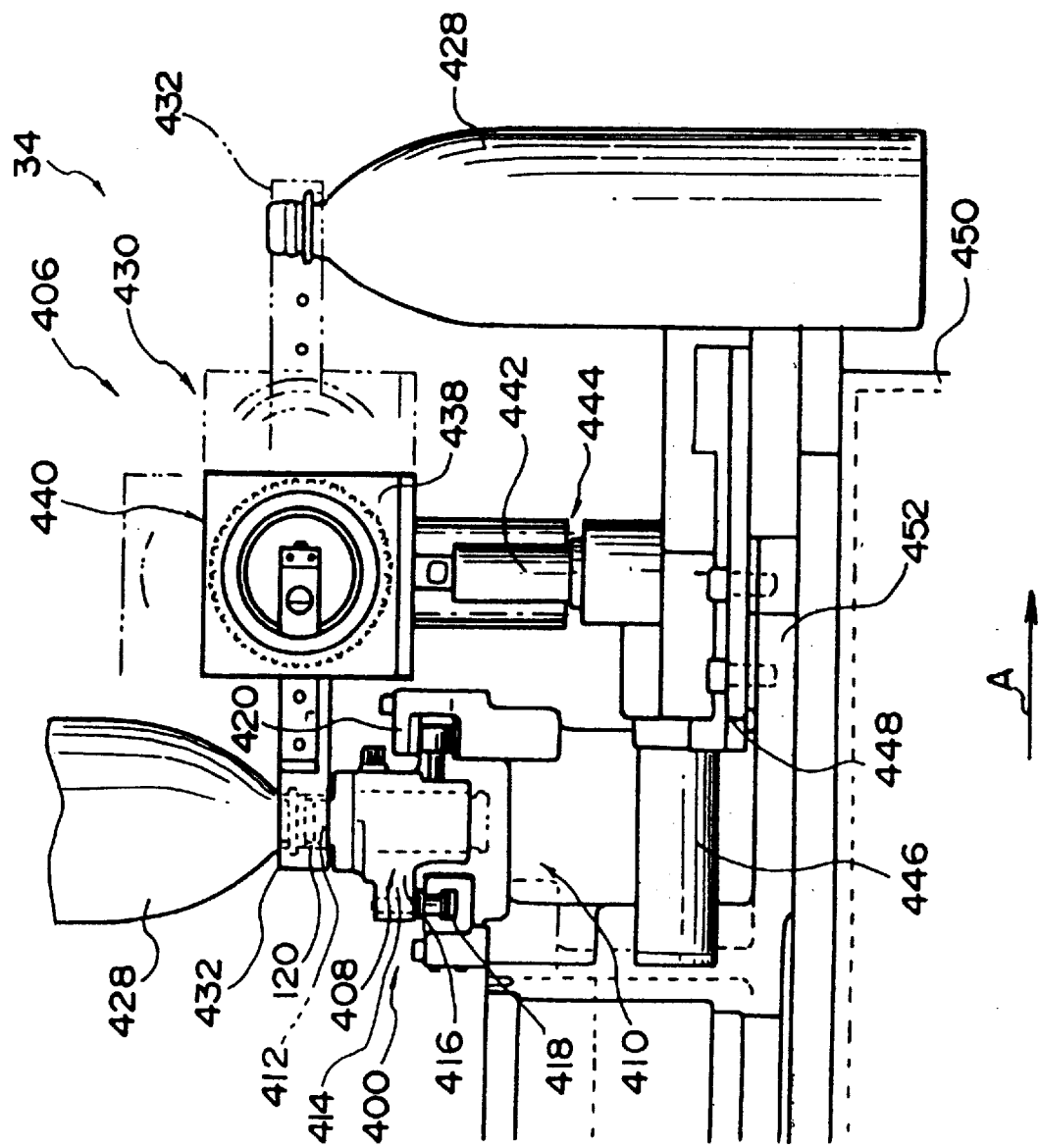
FIG. 14 is a side view of the removing section in the blow molding station of FIG. 1.
Figure 15:
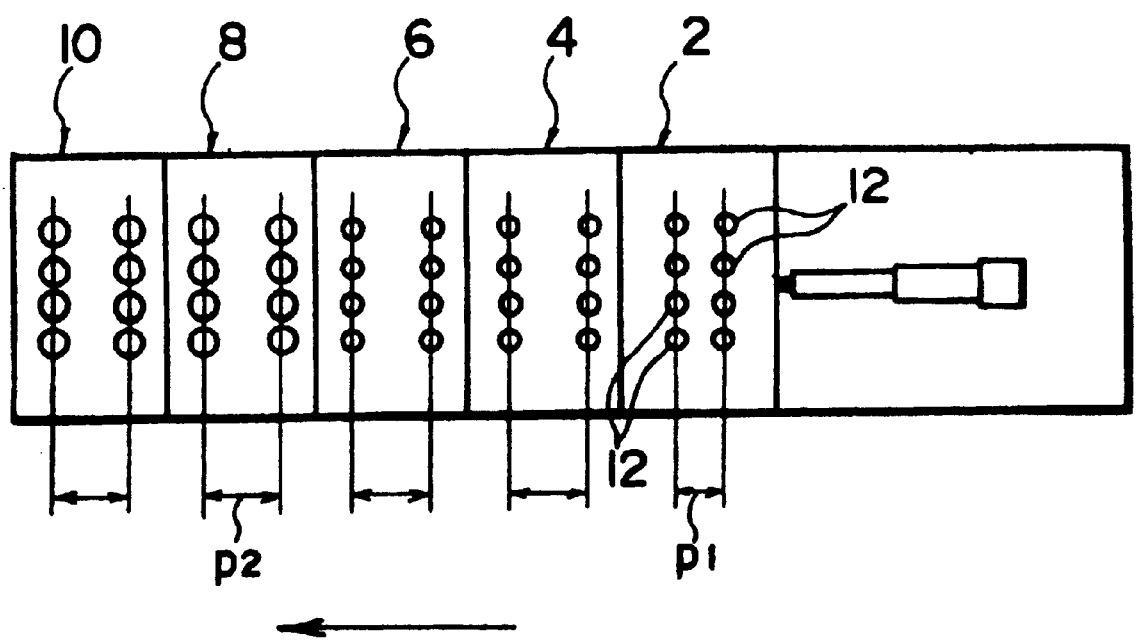
FIG. 15 is a plan view of an injection blow molding system according to the prior art.

Each of the blow molding station units 34 comprises a second carrying path 400, a receiving section 402, a blow molding section 404 and a removing section 406, as shown in FIGS. 1 and 14.

The second carrying path 400 is of a substantially rectangular configuration which has one side disposed opposed to the corresponding second delivering section 410. The second carrying path 400 thus comprises second carrying members 408 and a second carrying mechanism 410.

Each of the second carrying members 408 is designed to support and carry an inverted preform 36 and supported by a bracket 414 with a preform supporting portion 412 extending upward therefrom.

The second carrying mechanism 410 is designed to carry the second carrying members 408 intermittently and comprises a substantially rectangularly disposed second carrying chain 418 which are passed around four sprockets 416 on the corresponding second carrying path 400 at the respective corners. The second carrying chain 418 is guided by a second carrying rail 420 which is disposed along the second carrying path 400. Each group of four second carrying members 408 with the blow molding pitch is connected to the second carrying chain 418 through the bracket 414.

Any one of the four sprockets 416 is operatively connected to an intermittently carrying motor (not shown) which can be actuated to carry each group of four second carrying members 408 in the intermittent manner.

The receiving section 402 is located adjacent to the second delivering section 32 in the respective second carrying path 400 for receiving four preforms 36 from the second delivering section 32 at a time. The four second carrying members 408 are intermittently stopped a position corresponding to the four gripping members 510 in the second delivering section 32.

Each of the blow molding sections 404 is located on one side of the respective second carrying path 400 downstream in the preform carrying direction and designed to simultaneously stretch blow mold the preforms 36 received by the receiving section into containers. The blow molding section 404 thus comprises a stretch blow molding device 422 for simultaneously stretch blow molding four preforms 36 received by the receiving section 402 into containers. The stretch blow molding device 422 is designed to open/close its mold halves in the direction perpendicular to the preform carrying direction along the second carrying path 400 in the respective blow molding section 404. Thus, the stretch blow molding device 422 comprises a mold clamping mechanism 424 located within a space between the opposite sides of the second carrying path 400.

A stand-by section 426 for receiving the preforms 36 to be blow molded by one shot is located between the receiving section 402 and the stretch blow molding device 422 of the blow molding section 404. At the stand-by section 426, the difference of temperature in the preforms 36 heated by the heating station 30 can be reduced. The stand-by section 426 may be provided with a temperature regulating section for flat containers.

The removing section 406 is located on one side of the second carrying path 400 opposed to the receiving section 402 and designed to remove the containers from the stretch blow molding device 422 of the blow molding section 404 after the containers have been stretch blow molded by the stretch blow molding device 422. For such a purpose, the removing section 406 includes a removing device 430 which is located on the second-carrying path 400 at a position opposed to the removing position and which can remove four containers 428 at the removing section 406.

As shown in FIG. 14, the removing device 430 comprises four gripping members 432 disposed at a position opposed to the necks of the containers 428, an opening/closing mechanism 436 having an opening/closing cylinder 434 for opening/closing the gripping members 432, an inverting mechanism 440 having an inverting actuator 438 for inverting the gripping members 432, an elevator mechanism 444 having an elevator cylinder 442 for elevating the opening/closing and inverting mechanisms 436, 440 as well as the gripping members 432, and an advancing/retracting mechanism 448 having an advancing/retracting cylinder 446.

When the advancing/retracting cylinder 446 is actuated to retract the opening/closing and inverting mechanisms. 436, 440 and gripping members 432 out of the removing section 406 on the second carrying path 400, the gripping members 432 are waited being opened toward the second carrying path 400. As the containers 428 are stopped on the second carrying path 400, the advancing/retracting cylinder 446 is actuated to advance the gripping members 432. The opening/closing cylinder 434 is then actuated to close the gripping members 432 for gripping the necks of the containers 428. The elevator cylinder 442 is then actuated to move the gripping members 432 in the upward direction so that the necks of the containers 428 will be removed out of the second carrying members 408. Thereafter, the advancing/retracting cylinder 446 is actuated to retract the gripping members 432. The elevator cylinder 442 is lowered while the inverting actuator 438 is actuated to invert the gripping members 432. At this time, the opening/closing cylinder 434 is actuated to open the gripping members 432. As a result, the necks of the containers 428 will be released. The containers will fall and be removed out of the system.

Each of the blow molding station units 34 includes a plurality of bases (not shown) on the machine base 450. One of the bases adjacent to the removing section 106 is a movable base that can be moved relative to the stationary base along the longer sides of the second carrying path 400. The movable base includes two of the sprockets 416 for the second carrying mechanism 410.

The movable base 452 also includes a biasing mechanism for biasing the movable base 452 in a direction in which the opposite sides of the second carrying path 400 are separated away from each other to bias the second carrying chain 418.

The removing device 430 is integrally mounted on the movable base. Thus, it is not required to center the removing device 430 after the tension in the second carrying chain 418 has been adjusted.

An injection blow molding method using the aforementioned injection blow molding system 20 will now be described.

In the injection molding step, the injection molding station 22 first moves the upper mold clamping plate 50 of the injection molding device 42 in the downward direction to close the injection cavity mold 54, injection core molds 56 and split neck cavity molds 62. When the resin material is injected into the cavities of the injection cavity mold 54, four rows of eight preforms arranged in the direction B perpendicular to the preform carrying direction A are simultaneously injection molded.

After the injection molded preforms 36 have been cooled for a given time, the clamping/driving cylinder (not shown) is actuated to move the upper mold clamping plate 50 in the upward direction for releasing the preforms 36 out of the injection cavity mold 54. The hydraulic releasing cylinder 78 is then actuated to slightly move the stripper plate 66 relative to the injection core mold fixing plate 58 in the downward direction. Thus, gaps are formed between the injection core molds 56 and the preforms 36. Therefore, the preforms 36 can be released out of the injection core mold 56 while the split neck cavity molds 62 hold the necks of the preforms 36 relative to the injection core molds 56.

When the preforms 36 are in their released position out of the injection core molds 56, the stripper plate elevator cylinder 72 is actuated to move the bottom end of the stripper plate elevator rod in the downward direction. As a result, the stripper plate will be moved in the downward direction.

It is preferred that the stripper plate 66 is stopped at its lowermost limit so that the preforms 36 will not be completely drawn out through the stopper rods (not shown).

At this lowermost limit position, the neck mold opening cylinder 94 is actuated to move the neck mold opening cams in the downward direction. The neck mold opening cams then open the neck mold fixing plate guide rails 68. Thus, the neck mold fixing plate 64 opens the split neck cavity molds 62 wherein the necks of the preforms 36 are released. As a result, the preforms 36 will fall and be removed out of the system.

Since the injection core molds 56 remain within the respective preforms 36 at this time, the preforms 36 can fall while substantially maintaining their centers under the control of the injection core molds 56.

Figure 4:
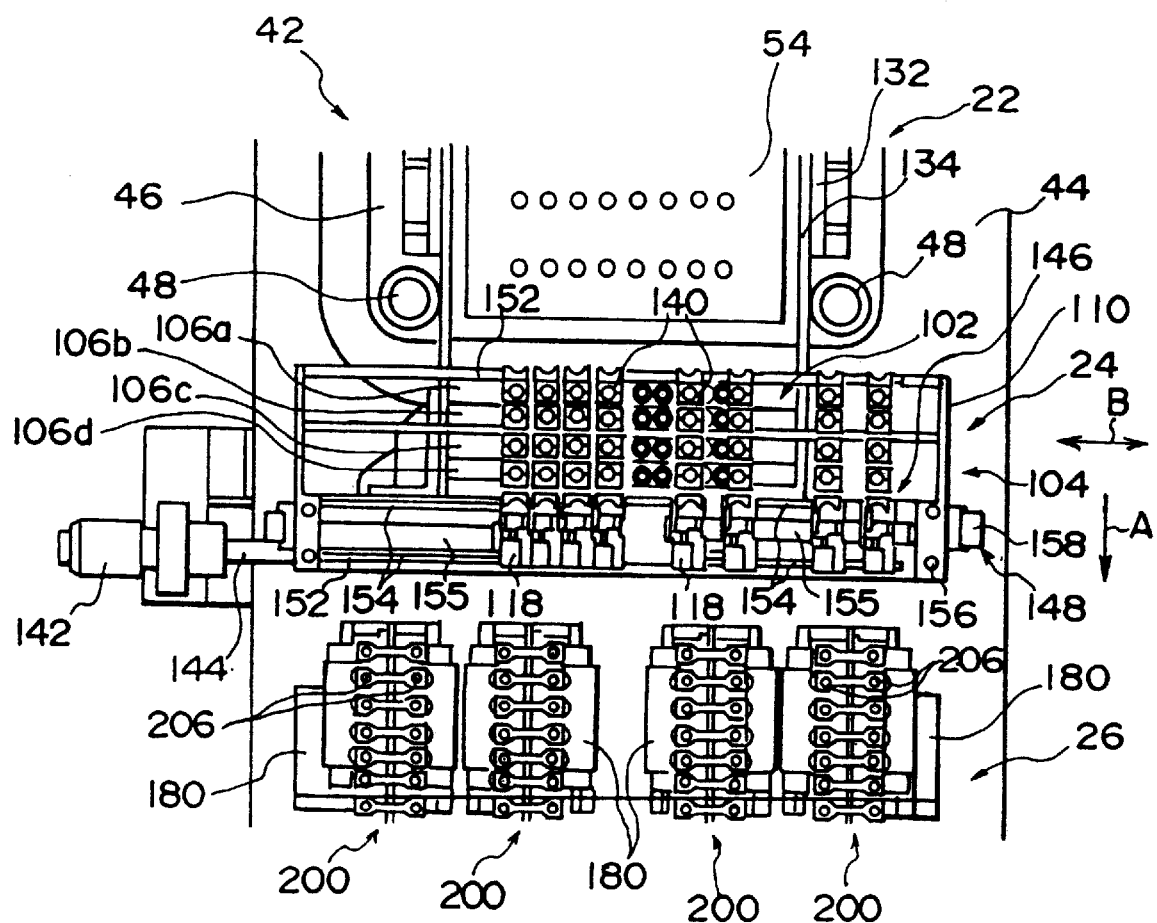
FIG. 4 is a plan view of a column pitch change in the inverting mechanism on the first delivering section of FIG. 3.

In the first delivering step, the removing cylinder 138 in the first delivering section 24 is actuated to move the removing plates 106a, 106b, 106c and 106d of the removing mechanism 102 rightward as viewed in FIGS. 3 and 4 from the position in which the removing plates have been reduced in pitch along the removing rails 134. The pitch in the removing plates 106a, 106b, 106c and 106d is changed to the larger row pitch in the injection molded preforms 36 through the stopper rods 136. The receiving members 112 on the removing plates 106a, 106b, 106c and 106d will be positioned below the respective preforms 36. As the preforms 36 are released from the split neck cavity molds 62 and then fall onto the receiving members 112, parts of the bottoms and barrels of the preforms 35 will be housed and held with the portions of the preforms 36 adjacent to the necks thereof being outward exposed. In such a manner, the preforms 36 simultaneously injection molded will be simultaneously received by the receiving members 112.

The removing cylinder 138 is then actuated to move the removing plate 106a leftward as viewed in FIGS. 3 and 4. This causes the row pitch changing mechanism 108 to urge the removing plate 106a against the other removing plates 106b, 106c and 106d. The engagement between the removing plates 106a, 106b, 106c and 106d reduces the row pitch in the injection molded preforms 36 which are in turn positioned on the side of the inverting mechanism 104.

In such a case, the removing plates 106a, 106b, 106c and 106d can be stably moved since they are moved on the removing rails 134 which are supported by the removing rail support plates 132 between the tie-bars 48.

The inverting mechanism 104 is placed at the removing position D after the removing mechanism 102 has removed the preforms 36 with the changed column pitch and when the holding members 140 are matched to the column and row pitches in the removing mechanism. At this time, the holding member opening/closing cylinder 118 is actuated to open the holding members 140. The elevator cylinder 158 in the elevator mechanism 148 is then actuated to move the holding members 140 downward to the holding position C. The holding members 140 are then closed to hold the portions of the preforms 36 adjacent to the necks thereof.

At this time, the portions of the preforms 36 adjacent to the necks thereof can be easily and reliably held by the holding members 140 since they are exposed out of the receiving members 112.

The elevator cylinder 158 is again actuated to move the holding members 140 upward to the removing position D. As a result, the preforms 36 will be drawn out of the receiving members 112.

The inverting motor 142 is then actuated to rotate the inverting arms 110 toward the cooling station 26 about the inverting shaft 144 for inverting the preforms 36.

During this inverting step, the column pitch changing cylinder 155 in the column pitch changing mechanism 146 is actuated to move a set of four left- and right-hand holding members 140 outward so that the column pitch in the holding members 140 is changed to the preform carrying pitch required by the cooling station 26 through the guide rods 154.

During the inverting step, further, the elevator cylinder 158 is also actuated to move the inverting arms 110 toward the delivery/stand-by position E, so that any interference between the inverting arms 110 and the cooling station 26 can be avoided.

As the inverting step terminates, the holding members 140 are in the delivery/stand-by position E.

After it has been confirmed that all the four preforms have been carried out, the elevator cylinder 158 is actuated to move the inverting arms 110 in the downward direction so that the holding members 140 will be moved to the delivery position F wherein the inverted preforms 36 are received by the first carrying members 206 in the cooling station 26.

Since the first carrying members 206 have been positioned by the positioning plate 180 at the receiving position, the preforms 36 can be reliably inserted into the first carrying members 206.

The holding members opening/closing cylinder 118 is then actuated to open the holding members 140 which are in turn elevated to the delivery/stand-by position E by the elevator cylinder 158. Thus, the simultaneously molded preforms 36 will be simultaneously delivered.

After termination of the delivery, the inverting mechanism 104 returns the inverting arms 110 to their original position. During of this returning step, the column pitch changing mechanism 146 is returned to its original position while at the same time the first carrying members 206 are returned to the removing position D wherein they are placed in their stand-by position.

In such a manner, the removing mechanism 102 can remove the injection molded preforms 36 after the row pitch in these preforms 36 has been reduced by the row pitch changing mechanism 108. The inverting mechanism 104 can deliver the inverted preforms 36 to the cooling station 26 after the column pitch in the inverted preforms 36 has been changed to the carrying pitch required by the cooling station 26 while maintaining the reduced row pitch. Thus, the preforms can be more effectively carried in the cooling station 26 with the reduced carrying pitch.

The simultaneously molded preforms can be simultaneously delivered from one station to the other station. The column pitch changing operation as well as the elevating operations can be simultaneously performed during the inverting operation. Thus, time required to make the delivery can be reduced to decrease the molding cycle. Since the removing mechanism is separated from the inverting mechanism, further, each of these mechanisms can be reduced in weight. This can improve the operational speed of the entire system.

In the cooling step, the inverted preforms 36 are intermittently carried along the first carrying path 200 while they are held by the first carrying members 206 and rotated about their longitudinal axes by the rotation mechanism 176. The cooling air is conducted from the cooling fan 172 to the preforms 36 through the guide plate 174 to additionally cool the preforms 36. This can increase the heating influence in the heating station 30.

At this time, the preforms 36 can be uniformly cooled around their circumferences since they are rotated about their axes by the rotation mechanism After the cooling step and before the heating step, the gate in each of the preforms 36 can be easily and reliably cut away by the gate cutting mechanism 170 while not being rotated.

In the heating step, the preforms 36 cooled by the cooling station 26 are intermittently carried along the first carrying path 200. The preforms 36 are heated by the heating boxes 202 on the middle of each first carrying path 200 up to an appropriate blow molding temperature while the first carrying members 206 are being rotated about their axes by the rotation mechanism 204. Thereafter, the preforms 32 are moved to the second delivery section 32.

The preforms 36 can be uniformly heated around their circumferences since they are rotated by the rotation mechanism 204.

In each of the first carrying paths 200, the preform necks and first carrying members 206 will not be excessively heated with thus avoiding any adverse effects since the preforms 36 are heated while they are being carried by the first carrying members 206 in their inverted state.

Each of the first carrying paths 200 includes a gap corresponding to a space of one row of the preforms 36 provided between the upstream and downstream heating boxes 202. When one row of the preforms 36 are rested within such a gap, the difference of temperature between the inner and outer walls of that preforms after they have been heated by the upstream heating box 202 can be reduced before they are moved into the downstream heating box 202.

As shown in FIG. 9, the cooling air can be supplied into the interior of the heating boxes 202 by the blowers 348. This can prolong the service life in the reflectors 240 as well as the service life in the internal heaters 238 by cooling the terminal bases 204 and the opposite supported ends of the heaters 238. The heaters 238 can be moved toward or away from the preforms 36 within the heating boxes 202. Thus, the temperature profile in the preforms 36 along their longitudinal axes can be easily regulated.

In the second delivering step, the gripping members 510 are first positioned at the preform removing position in each of the heating stations 30. The elevator mechanism 514 is then actuated to move the gripping members 510 to the preform gripping position while at the same time the gripping member opening/closing mechanism 512 is actuated to open the gripping members 510. Thus, the preforms 36 will be placed in their stand-by position.

In each of the heating stations 30, the gripping members 510 are closed after the inverted and heated preforms 36 have been carried to and stopped at the preform receiving position. Thus, the necks of the preforms 36 are gripped by the gripping members 510. Thereafter, the gripping members 510 are moved in the upward direction to draw the necks of the preforms 36 out of the first carrying members 206.

As the movement members 536 are then moved along in the preform carrying direction A along the movement guide rods 534, the elevator mechanisms 514 are also moved through the contacting/separating movement guide rods 538 and contacting/separating movement members 540. Two gripping members 510 are thus moved outside of the respective movement guide rods 534 in the preform carrying direction A.

As the contacting/separating movement guide rods 538 are moved with the movement of the movement members 536 in the preform carrying direction A, the contacting/separating movement members 540 are moved toward each other being guided by the pitch changing guide rods 542. As the gripping members 510 reach the receiving position in each of the blow molding stations 34, the pitch in the inner gripping members 510 mounted on the pair of gripping member opening/closing mechanisms 512 is changed to the blow molding pitch.

As the intermittently carried second carrying members 408 are stopped at each of the receiving sections 402, each of the elevator mechanisms 514 is then actuated to move the gripping members 510 in the downward direction. Each of the gripping member opening/closing mechanisms 512 is then actuated to open the gripping members 510, so that the preforms 36 gripped by the gripping members 510 can be delivered to the respective second carrying members 408 in each of the blow molding stations 34.

When the elevator mechanism 514 is again actuated to move the gripping members 510 in the upward direction so that the gripping members 510 are retracted from the corresponding second carrying path 400, the preforms 36 can be carried along the second carrying path 400. The rodless cylinder 532 is then actuated to move the movement members 536 toward each of the heating stations 30. When the elevator mechanism 514 is -then actuated to move the gripping members 510 in the downward direction, the stand-by state for the next removing step can be attained.

In the blow molding step, every four inverted preforms 36 are intermittently carried by the second carrying chains 418 of the second carrying mechanisms 410 while their necks are supported by the second carrying members 408 after the inverted preforms have been received by the receiving section 402 from the second delivery section 32 in each of the blow molding stations 34, as shown in FIGS. 1 and 14. At the beginning of the intermittently carrying step, the preforms 35 are placed in the stand-by section 426 between the receiving section 402 and the blow molding section 404. During the stand-by state, the temperature in the preforms 36 heated by the heating station 30 is moderated.

After the temperature in the four preforms 36 has been moderated in the stand-by section 426, they are intermittently carried to the blow molding section 404. After the blow molds have been closed by the mold clamping mechanism 424 or the like, the four simultaneously heated preforms 36 are stretch blow molded into containers 428.

Since the simultaneously heated preforms 36 are blow molded into containers at the same time, the quality of blow molding can be maintained regular.

The blow molded containers 428 are then intermittently carried to the removing device 430 in the removing section 406.

When the advancing/retracting cylinder 446 of the advancing/retracting mechanism 448 is actuated to retract the removing device 430 from the second carrying path 400, the gripping members 432 are placed in their stand-by position in which they are opened to the second carrying path 400. As the containers 428 are carried, the gripping members 432 are advanced and closed to grip the necks of the containers 428. The elevator cylinder 442 is then actuated to move the gripping members 432 in the upward direction so that the necks of the containers 428 will be drawn out of the second carrying members 408. The advancing/retracting cylinder 446 is then actuated to retract the gripping members 432 and the elevator cylinder 442 are lowered. The inverting actuator 438 is thereafter actuated to invert the gripping members 432. If the gripping members 432 are opened at this time, the necks of the containers 428 will be released with the containers falling and being removed. Since the removing device 430 is mounted on the movable base used to tension the second carrying chains 418, it is not required to center the removing device 430 relative to the second carrying members 408 after adjustment of the tension.

The present invention is not limited to the aforementioned embodiment, but may be applied to various other forms within the scope of the invention.

For example, the number of preforms in one row and the number of preforms to be simultaneously molded may be suitably varied, although the aforementioned embodiment has been described as to four rows of eight preforms simultaneously injection molded in the injection molding station.

In the aforementioned embodiment, each of two heating stations heats four preforms and each of the blow molding stations blow molds four preforms. However, the present invention is not limited to such an arrangement, but the number of preforms to be carried may be optionally varied.

In the aforementioned embodiment, the pitch in the injection molded preforms is changed to the blow molding pitch required by the blow molding station when the preforms are to be carried from the heating station to the blow molding station. However, the present invention is not limited to such an arrangement, but may be applied to another form in which the carrying pitch in the preforms at the heating station has been preset to the blow molding pitch. Thus, it is not required to change the pitch in the second delivery section.

Another embodiment of an injection blow molding system constructed in accordance with the present invention will be described with reference to FIGS. 16–21.

Figure 16:
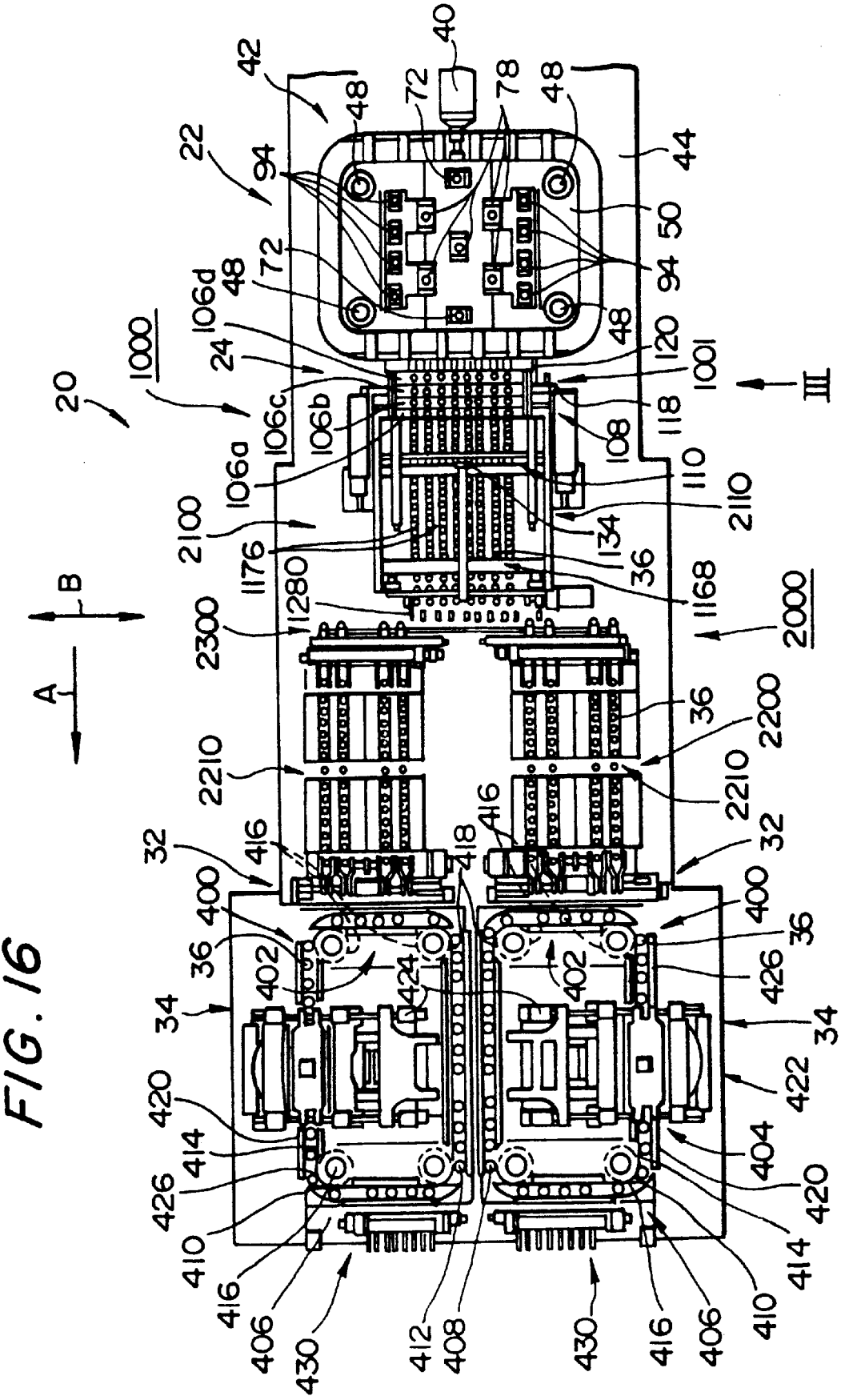
FIG. 16 is a schematic plan view of another embodiment of an injection blow molding system constructed in accordance with the present invention.

FIG. 16 is a plan view showing the entire layout of the injection blow molding system, in which the components having the same functions as in the system of FIGS. 1–14 are designated by the same reference numerals, the detailed description thereof being omitted.

The injection blow molding system shown in FIGS. 16–19 is substantially different from the system of FIG. 1 only in that the former includes first delivery sections 1000 and first carrying paths 2000.

Figure 19:
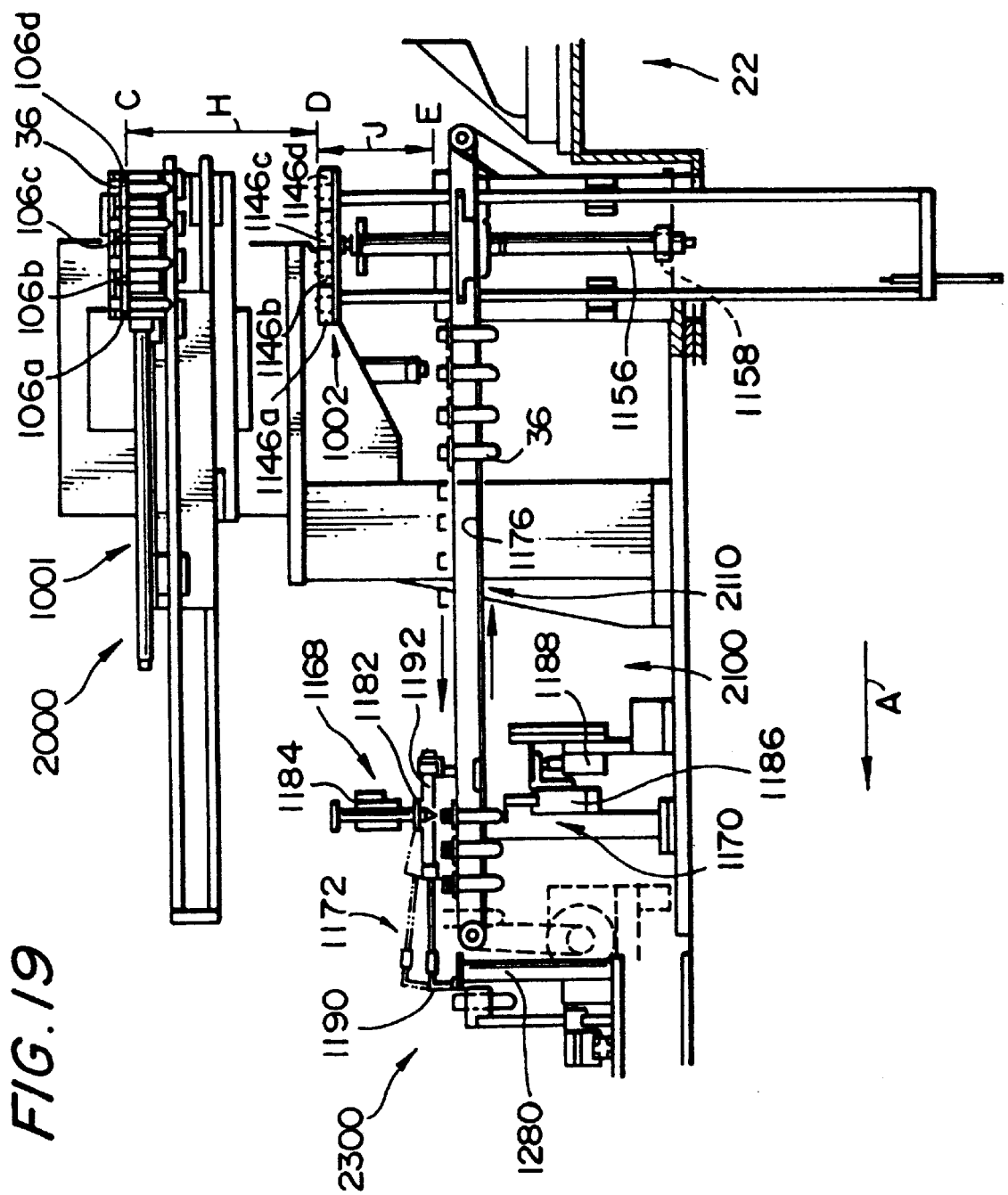
FIG. 19 is a schematic side view of the first delivering section and cooling station in the system of FIG. 16.

As shown in FIG. 19, each of the first delivery sections 1000 comprises a removing mechanism 1001 having substantially the same function as in the system of FIG. 1, and a delivering mechanism 1002 for delivering the removed preforms to the corresponding first carrying path 2000 in their upright state.

As shown in FIG. 16, each of the first carrying paths 2000 comprises a primary carrying path 2110 including a cooling station 2100 disposed therein and a secondary carrying path 2210 including a heating station 2200 disposed therein. The primary carrying path 2110 is designed to parallel carry one row of N preforms in their upright state while the secondary carrying path 2210 is designed to parallel carry one row of N preforms in their inverted state. The first carrying path 2000 includes an intermediate delivery section 2300 located between the primary and secondary carrying paths 2110, 2210 for inverting and delivering the preforms.

In this embodiment, the delivering mechanism 1002 of the first delivery section 1000 must deliver a N×M matrix of injection molded preforms to the primary carrying path 2110 in their upright state since the upright preforms are carried along the upstream or primary carrying path 2110 in the first direction A.

The structure and function of such a delivering mechanism 1002 will be described with reference to FIGS. 18 and 19.

Figure 18:
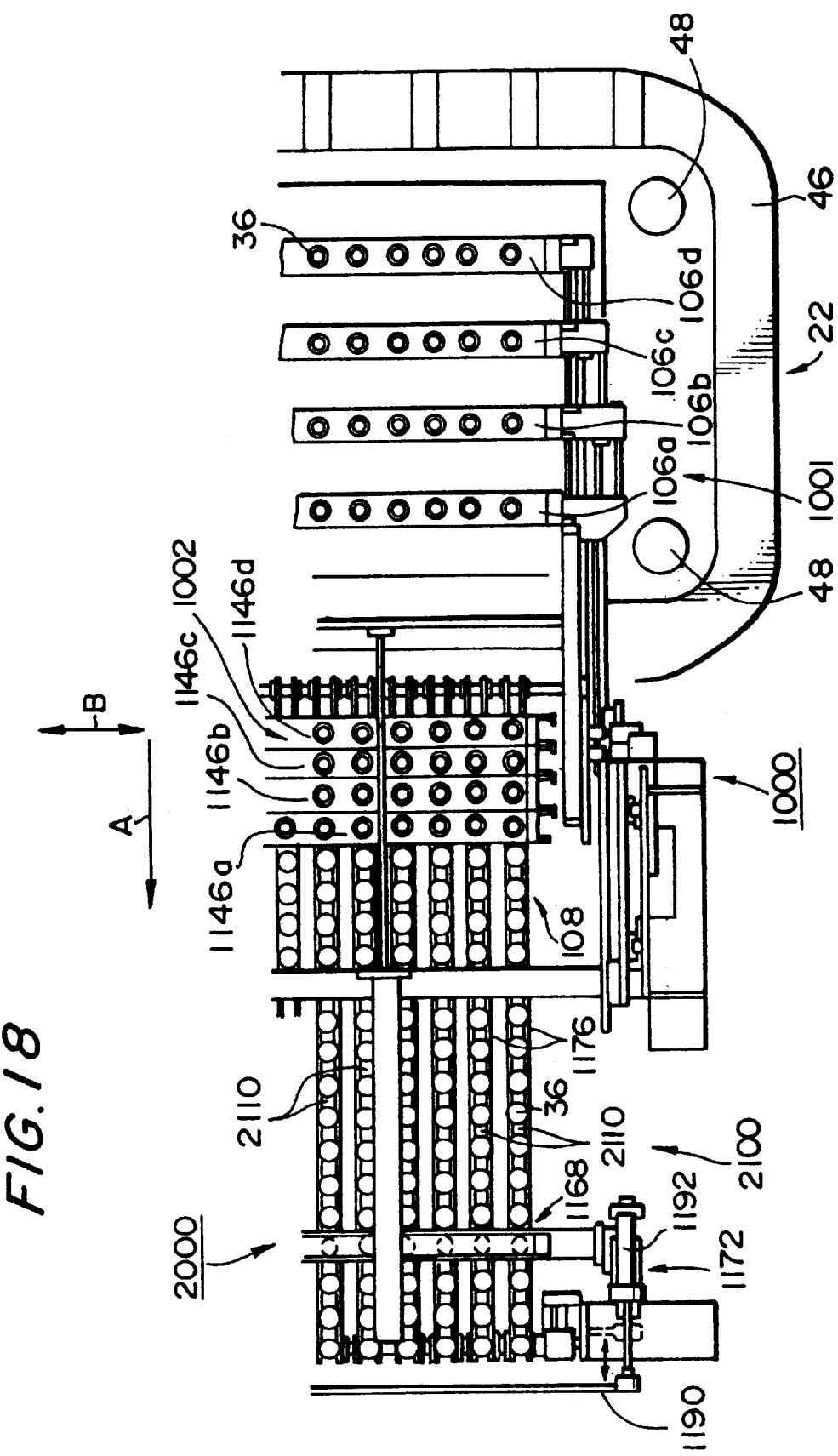
FIG. 18 is a schematic plan view of the first delivering section and cooling station in the system of FIG. 16.

FIG. 18 is a plan view showing the preforms 36 held by the removing plates 106a, 106b, 106c and 106d while FIG. 19 is a side view showing the preforms removed from the injection molding station 22 after the row pitch in the removing plates 106a, 106b, 106c and 106d shown in FIG. 18 has been reduced.

As shown in FIG. 19, there are receiving plates 1146a, 1146b, 1146c and 1146d that are placed in the stand-by position D. In such a situation, a first elevator cylinder 1156 is upward actuated to move the receiving plates 1146a, 1146b, 1146c and 1146d by a distance H and directly below the removing plates 106a, 106b, 106c and 106d which are placed at the preform receiving position.

Thereafter, the preforms 36 held by the removing plates 106a, 106b, 106c and 106d are caused to fall and to be supportingly inserted into the respective bores in the receiving plates 1146a, 1146b, 1146c and 1146d.

The first and second elevator cylinders 1156, 1158 are then actuated to move the receiving plates 1146a, 1146b, 1146c and 1146d downward to the delivering position E through the stand-by position D. A receiving plate opening/closing cylinder (not shown) is actuated to deliver the preforms 36 from the receiving plates 1146a, 1146b, 1146c and 1146d to the cooling station 2100.

The structure and function of the cooling station 2100 will be described.

In the cooling station 2100, one row of eight upright preforms 36 are cooled by blower means while they are supported and intermittently carried from the injection molding station 22 toward the intermediate delivery section 2300 along the primary carrying path 2110 by a carrying belt 1176 with a row pitch smaller than the row pitch in the injection molding step. If each of the preforms is of a relatively thin wall-thickness, the preforms may be spontaneously cooled without use of any blower means.

As one row of eight preforms 36 are intermittently carried to and stopped at a position corresponding to centering cores 1182 shown in FIG. 19, a row correcting mechanism 1168 actuates a centering core elevator mechanism 1184 to downward move and insert the centering cores into the mouths of the preforms 36. As a result, the preforms 36 are correctly arranged into one row.

When the row correction is performed by the row correcting mechanism 1168 inserting the centering cores 1182 into the mouths of the preforms 36, a gate cutting mechanism 1170 actuates a gate cutter elevator mechanism 1188 to upward move gate cutters 1186 for cutting the bottom gates of the preforms 36.

When the corrected row of preforms 36 are stopped at the final end of the primary carrying path 2110, an ejecting mechanism 1172 is then actuated to move ejecting plates 1190 behind one row of preforms 36 at the final end of the primary carrying path 2110. While maintaining such a state, an ejecting cylinder 1192 is actuated to move the ejecting plates 1190 in the forward direction. As a result, one row of preforms 36 will be moved into the intermediate delivery section 2300.

In the intermediate delivery, one row of eight preforms 36 are slidably moved on a slide base 1280 in the intermediate delivery section 2300 after the preforms 36 have been ejected out of the primary carrying path 2110 by the ejecting mechanism 1172. Thereafter, the preforms 36 will be held by two sets of receiving members 1270a, 1270b, 1270c and 1270d shown in FIG. 20.

Figure 20:
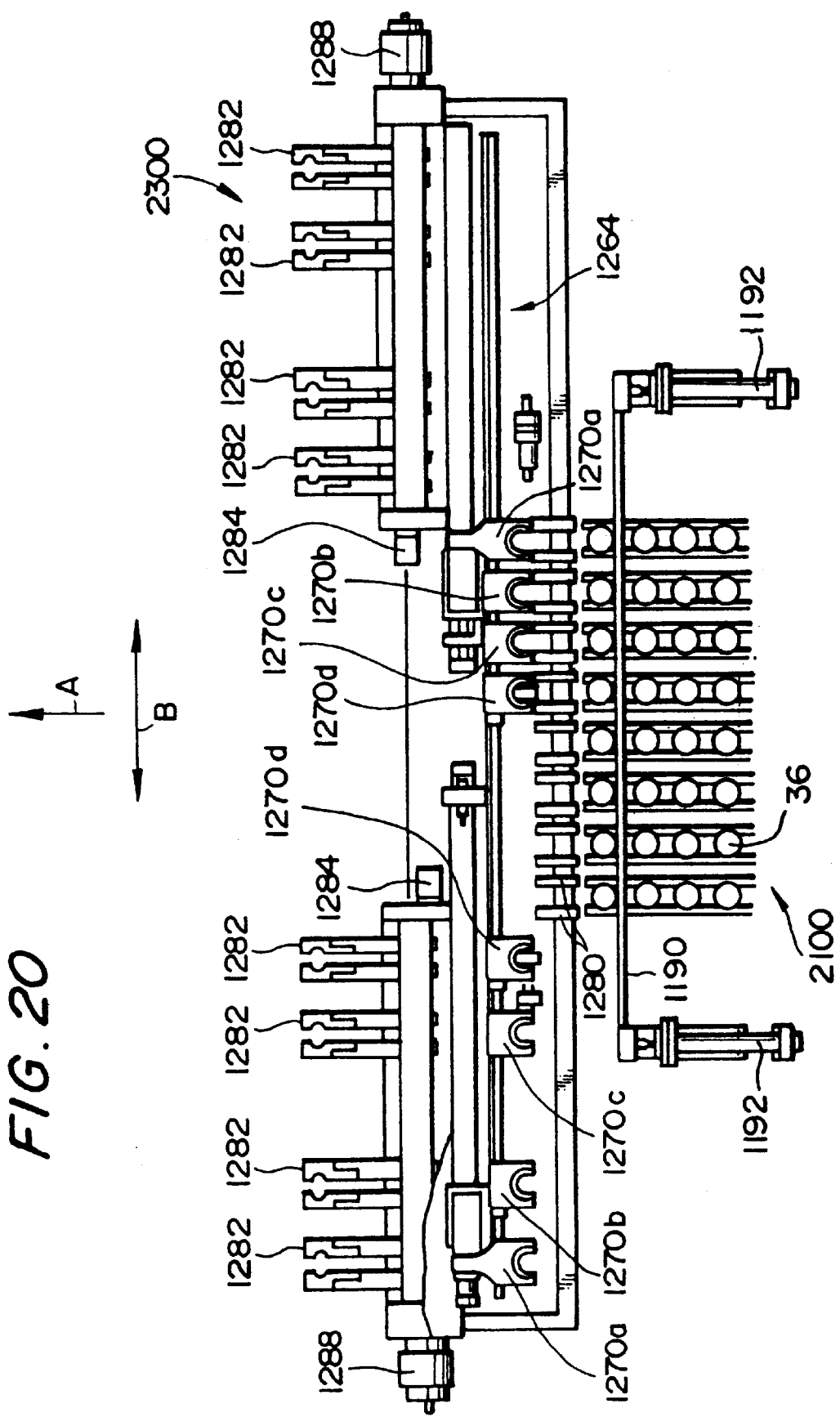
FIG. 20 is a schematic plan view of the intermediate delivering section in the system of FIG. 16.

As shown in FIG. 20, thereafter, the pitch in the receiving members 1270a, 1270b, 1270c and 1270d (i.e., a smaller pitch on the right-hand half of FIG. 20) is changed to a pitch in the preforms 36 at the heating station 2200 (i.e., a larger pitch on the left-hand half of FIG. 20) by a pitch changing mechanism 1264. This changes the column pitch in one row of eight preforms 36.

After the preforms 36 held by the two sets of receiving members 1270a, 1270b, 1270c and 1270d has been positioned at the delivering position, first gripping members 1282 are opened to the neck sides of the preforms 36. Under such a situation, an opening/closing cylinder 1284 is actuated to close the first gripping members 1282 for gripping the necks of the preforms 36.

An inverting actuator 1288 is then actuated to invert the first gripping members 1282 from the side of the cooling station 2100 toward the side of the heating station 2200. As a result, the preforms are inverted.

The elevator mechanism is then actuated to move the first gripping members 1282 downward. The opening/closing cylinder 1284 is then actuated to open the first gripping members 1282 so that the necks of the preforms 36 will be released. Thus, the inverted preforms 36 can be delivered to the heating station 2200.

In the heating step, one row of eight inverted preforms 36 are heated while being carried in parallel therethrough, as in the system of FIG. 1.

Figure 21:
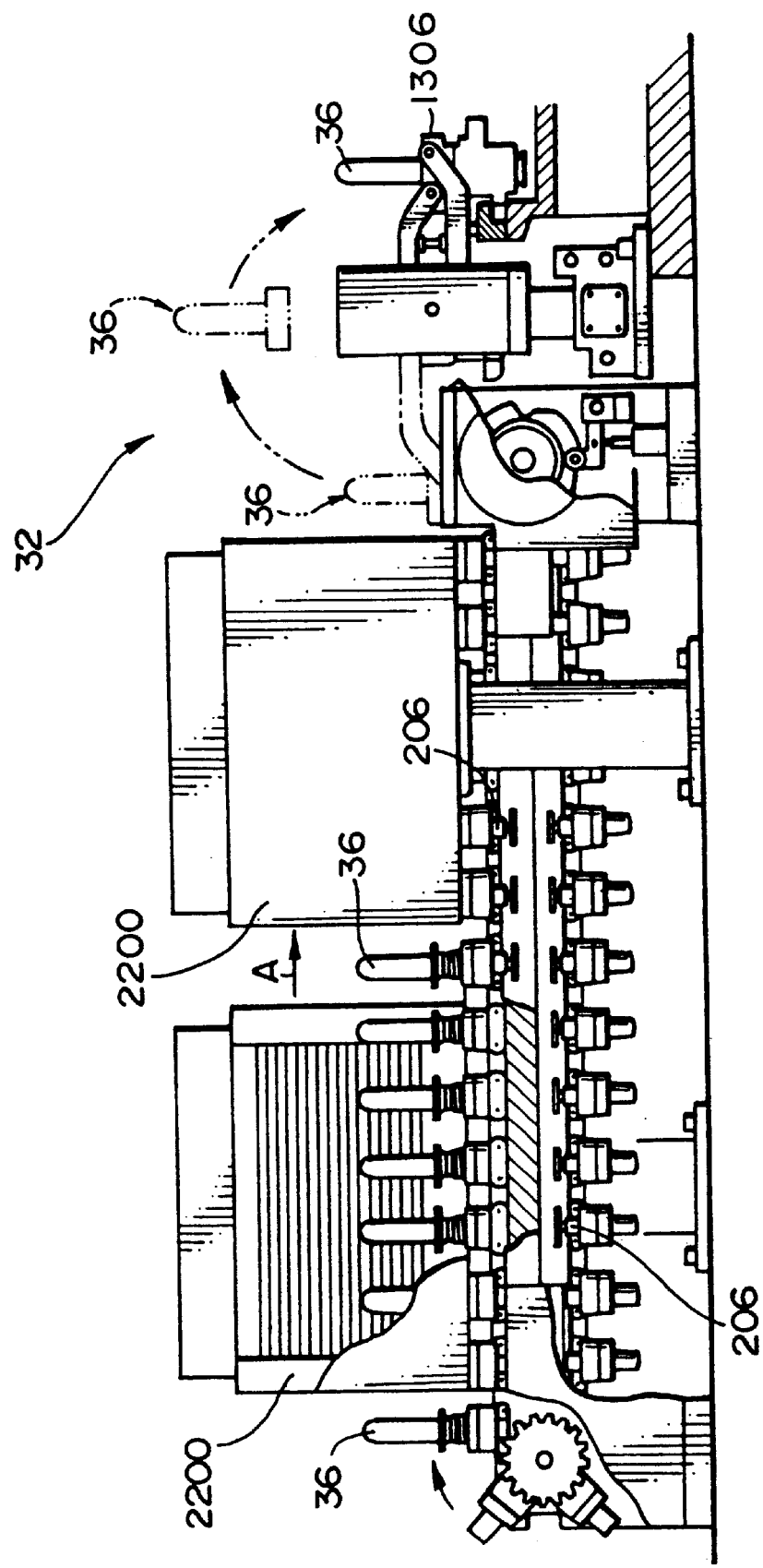
FIG. 21 is a schematic side view of the heating station and second delivering section in the system of FIG. 16.

In the second delivery step, as shown in FIG. 21, four sets of second gripping members 1306 in the second delivery section 32 are placed in a stand-by position having the same height as the necks of the preforms 36 being carried along the secondary carrying path 2210. As the preforms intermittently carried by the carrying members 206 are stopped at the transferring/removing position, the necks of the preforms 36 are gripped by the second gripping members 1306. As the second gripping members 1306 are upward moved by a given distance under such a situation, the preforms 36 are drawn out of the carrying members 206 on the secondary carrying path 2210.

As shown by chain line in FIG. 21, the second gripping members 1306 are then translated toward the blow molding station 34. Therefore, the preforms 36 can be transferred to the blow molding station 34 while they are maintained in their inverted state.

Figure 17:
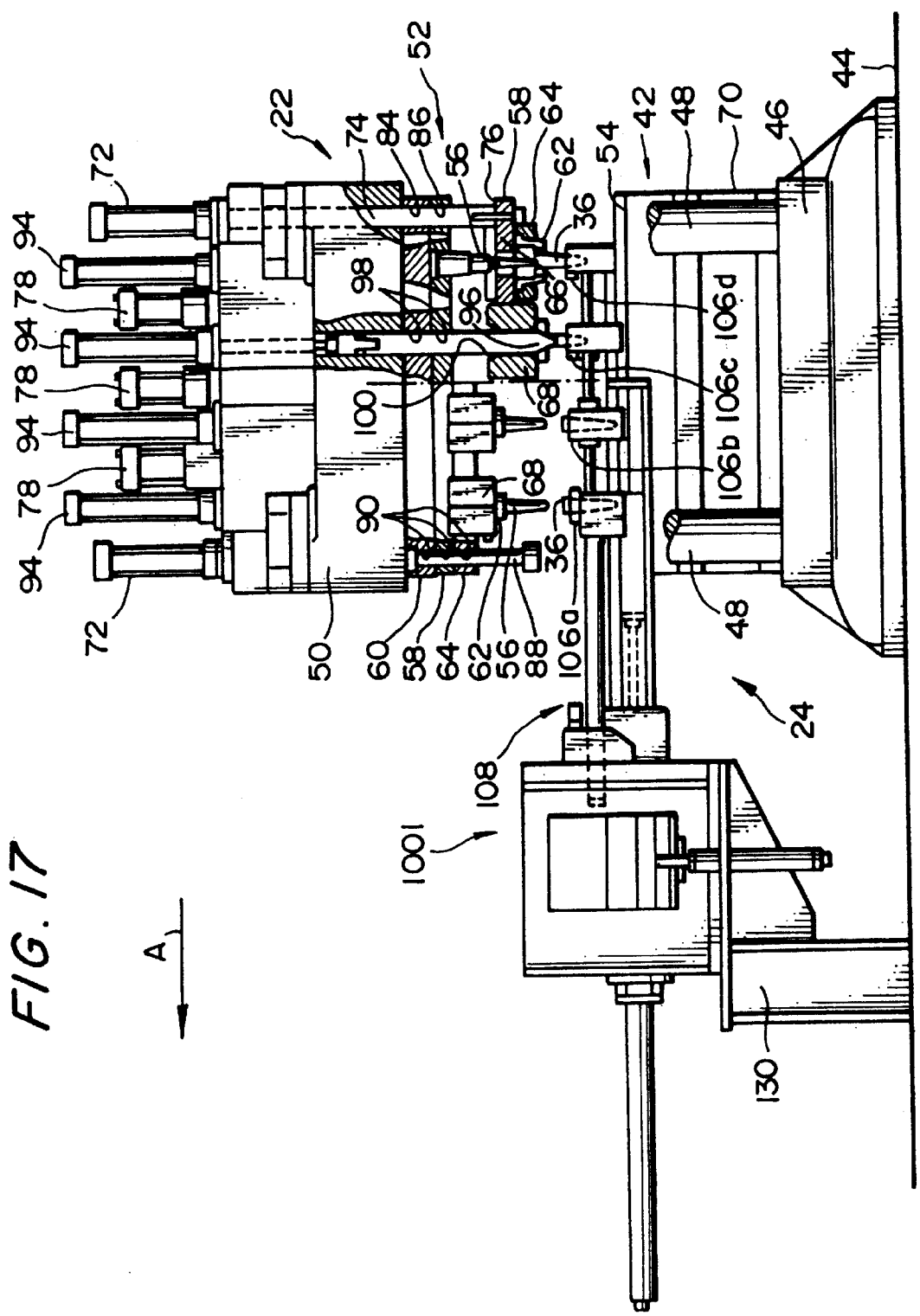
FIG. 17 is a side view of the injection molding station in the system of FIG. 16.

FIG. 17 shows the other components (not shown in FIG. 2) in the injection molds disposed within the injection molding station 22. The other components will be supplementarily described below.

FIG. 17 shows a stripper plate elevator rod 74 that is moved up and down by a stripper plate elevator cylinder 72. The stripper plate 66 includes a connection 76 to the stripper plate elevator rod 74. The injection core mold holding plate 60, injection core mold fixing plate 58 and stripper plate 66 are formed with bores 90 through which the stopper rods 88 extend. FIG. 17 further shows neck mold opening cams 96 each connected to the corresponding neck mold opening cylinder 94. A bore 100 receiving each of the neck mold opening cams 96 is formed in each of the divided plates that define the neck mold fixing plate guide rails 68. The injection core mold holding plate 60 and injection core mold fixing plate 58 are formed with bores 98 through which the neck mold opening cams 96 are inserted.

What is claimed is:

1. An injection molding device comprising:
   an injection mold which includes movable and stationary mold portions for simultaneously injection molding M×N preforms (M≧2, N≧2) in an upright state;
   a movable mold clamping plate for supporting said movable mold portion;
   a stationary mold clamping plate for supporting said stationary mold portion;
   a clamping plate driving mechanism which has four tie-bars to move said movable mold clamping plate in a vertical direction; and
   a removing mechanism for removing said M×N preforms; wherein:
      said stationary mold portion has an injection cavity mold;
      said movable mold portion has an injection core mold and split neck cavity molds; and
      said removing mechanism includes:
         at least one removing plate which moves between said movable and stationary mold clamping plates when opening said injection mold and holds and removes said injection-molded preforms; and
         a plurality of removing revolving rails for conducting said at least one removing plate at its opposite ends,
      wherein said plurality of removing rails are fixedly provided between said stationary mold portion and said four tie-bars and extend outside between said stationary mold portion and said four tie-bars, and
      wherein said removing mechanism includes M rows of said removing plates each for holding N preforms and a pitch changing mechanism which increases a row pitch in said M rows of removing plates when advancing and decreases the row pitch when retreating.

2. The injection molding device as defined in claim 1, wherein said plurality of removing rails are mounted on removing rail support plates which are fixedly mounted on said stationary mold clamping plate.

3. A mold device for injection molding M×N cylindrical bottom-closed preforms each having a neck, comprising:
   (a) an injection molding station comprising:
      (i) a stationary mold clamping plate;
      (ii) a movable mold clamping plate;
      (iii) an injection cavity mold mounted on said stationary mold clamping plate and comprising M×N cavity molds, wherein M≧2 and N≧2;
      (iv) an injection core mold which is clamped with said injection cavity mold when said movable mold clamping plate is driven and comprising M×N core molds;
      (v) an injection core mold fixing plate mounted on said movable mold clamping plate for fixing said injection core mold;
      (vi) an injection core mold holding plate mounted on said movable mold clamping plate between said injection core mold fixing plate and said movable mold clamping plate;
      (vii) split neck cavity molds which are clamped with said injection core mold;
      (viii) a neck mold fixing plate including split palates each of which holds a respective one of said split neck cavity molds;
      (ix) a stripper plate disposed between said neck mold fixing plate and said injection core mold fixing plate for moving relative to said injection core mold fixing plate, and
      (x) neck mold fixing plate guide rails for holding said neck mold fixing plate, said neck mold fixing plate being slidably movable relative to said stripper plate for guiding said neck mold fixing plate in the direction in which said split neck cavity molds are opened;
   wherein said stripper plate comprises:
      a connecting portion to a moving rod for moving said stripper plate; and
      an engaging portion being engaged with a release rod which moves said stripper plate downward to release said preforms from said injection core mold; and
   each of said injection core mold holding plate and injection core mold fixing plates has a bore through which said release rod extends, and the device further comprises:
      a removing mechanism for receiving the preforms released when the stripper plate moves downward and which includes M rows of removing plates each for holding N preforms, and a pitch changing mechanism which increases a row pitch in the M rows of removing plates when advancing and decreases the row pitch when retracting.

4. The mold device as defined in claim 3, wherein said injection core mold holding plate, said injection core mold fixing plate and said stripper plate are formed with bores through which a stopper rod for limiting the downward movement of said stripper plate extends.

5. The mold device as defined in claim 3, wherein said neck mold fixing plate guide rails are formed with wedge bores which receive neck mold opening cams for opening said split neck cavity molds.

6. The mold device as defined in claim 3, wherein said neck mold fixing plate guide rails are formed of divided members mounted on the respective split plates of said neck mold fixing plate, each of said divided members being biased by biasing means in a direction in which said split neck cavity molds are closed.

7. An injection molding device comprising:
   an injection mold which includes movable and stationary mold portions for simultaneously injection molding M×N performs in an upright state where M is greater than or equal to 2 and N is greater than or equal to 2 (M≧2, N≧2);
   a movable mold clamping plate for supporting said movable mold portion;
   a stationary mold clamping plate for supporting said stationary mold portion;
   a clamping plate driving mechanism which has four tie-bars for moving said movable mold clamping plate in a vertical direction; and
   a removing mechanism for removing said M×N performs;
   wherein:
      said stationary mold portion has in injection cavity mold;
      said movable mold portion has a injection core mold and split neck cavity molds; and
      said removing mechanism includes:
         at least one removing plate for moving between said movable and stationary mold clamping plates when said injection mold is open and for holding and removing said injection-molded preforms; and
         a plurality of removing rails for conducting said at least one removing plate at its opposite ends, and
      wherein said four tie-bars have a narrow tie-bar distance in a first direction and a wide tie-bar distance in a direction perpendicular to said first direction, and
      wherein said plurality of removing rails extend along said first direction, and
      wherein said removing mechanism includes M rows of said removing plates each for holding N preforms and a pitch changing mechanism which increases a row pitch in said M rows of removing plates when advancing and decreases the row pitch when retreating.

8. The mold device as defined in claim 4, wherein said neck mold fixing plate guide rails are formed with wedge bores which receive neck mold opening cams for opening said split neck cavity molds.

9. The mold device as defined in claim 4, wherein said neck mold fixing plate guide rails are formed of divided members mounted on the respective split plates of said neck mold fixing plate, each of said divided members being biased by biasing means in a direction in which said split neck cavity molds are closed.

10. The mold device as defined in claim 5, wherein said neck mold fixing plate guide rails are formed of divided members mounted on the respective split plates of said neck mold fixing plate, each of said divided members being biased by biasing means in a direction in which said split neck cavity molds are closed.

11. The mold device as defined in claim 8, wherein said neck mold fixing plate guide rails are formed of divided members mounted on the respective split plates of said neck mold fixing plate, each of said divided members being biased by biasing means in a direction in which said split neck cavity molds are closed.

* * * * *